United States Patent [19]  [11]  4,097,423
Dieterich  [45]  Jun. 27, 1978

[54] INORGANIC-ORGANIC COMPOSITIONS

[75] Inventor: Dieter Dieterich, Leverkusen, Germany

[73] Assignee: Bayer Aktiengesellschaft, Leverkusen, Germany

[21] Appl. No.: 527,476

[22] Filed: Nov. 26, 1974

Related U.S. Application Data

[63] Continuation-in-part of Ser. No. 446,558, Feb. 27, 1974, which is a continuation-in-part of Ser. No. 364,763, May 29, 1973, abandoned.

[30] Foreign Application Priority Data

| Jun. 3, 1972 | Germany | 2227147 |
| Mar. 2, 1973 | Germany | 2310559 |
| Nov. 30, 1973 | Germany | 2359610 |
| Nov. 30, 1973 | Germany | 2359616 |
| Jun. 14, 1974 | Germany | 2435950 |

[51] Int. Cl.² ............ C08G 18/32; C08K 3/34; C08K 3/36; C08K 3/40
[52] U.S. Cl. ............ 260/2.5 AK; 260/2.5 AT; 260/2.5 AM; 260/29.21 TN; 260/37 N
[58] Field of Search ............ 260/2.5 AK, 29.2 TN, 260/37 N, 2.5 AM, 2.5 AT

[56] References Cited

U.S. PATENT DOCUMENTS

| 3,607,794 | 9/1971 | Abbotson | 260/2.5 AK |
| 3,634,342 | 1/1972 | Boblitt | 260/2.5 AK |
| 3,893,081 | 9/1976 | Dieterich | 260/2.5 AJ |
| 3,975,316 | 8/1976 | Villa | 260/2.5 AK |

FOREIGN PATENT DOCUMENTS

| 1,362,003 | 4/1964 | France. |
| 1,419,552 | 10/1965 | France. |
| 1,137,465 | 12/1968 | United Kingdom | 260/2.5 AK |

Primary Examiner—C. Warren Ivy
Attorney, Agent, or Firm—Gene Harsh; Joseph C. Gil

[57] ABSTRACT

Inorganic-organic compositions obtained from a mixture of components comprising:
(a) from 5-98% by weight of an organic polyisocyanate;
(b) from 2-95% by weight of an aqueous alkali metal silicate solution containing about 20-70% by weight of said alkali metal silicate; and
(c) from 0-93% by weight of a water-binding component based on the total weight of (a), (b) and (c) with the proviso that when (c) is 0-20% by weight (a) contains 2-200 milliequivalents of ionic groups per 100 grams of said polyisocyanate.

Flexible inorganic-organic plastics which have a low calorific value and improved fire characteristics are prepared from a reaction mixture containing
(a) 30 to 70 percent by weight of one or more compounds with Zerewittinoff-active hydrogen atoms which have an average molecular weight of 400 to 6000, preferably 1000 to 6000, and a glass temperature below 10° C, preferably below −20° C;
(b) 10 to 30 percent by weight of an organic polyisocyanate; and
(c) 20 to 60 percent by weight of an aqueous alkali metal silicate solution which has a solids content of between 30 and 70 percent by weight.

The organic polyisocyanate may be one which contains a phenolic hydroxyl group.

The products of the invention may be used in many forms including both porous and non-porous products as surface coatings having good adhesion and resistance to abrasion, as a mortar, as a flexible elastomer, and as a foam concrete for making molded products particularly in construction engineering and civil engineering as for building walls, igloos, road buildings and the like.

35 Claims, No Drawings

INORGANIC-ORGANIC COMPOSITIONS

This application is a continuation-in-part of my copending application Ser. No. 446,558 filed Feb. 27, 1974 which application is a continuation-in-part of Ser. No. 364,763 filed May 29, 1973, now abandoned.

This invention relates generally to synthetic materials and more particularly to an improved inorganic-organic material formed, generally speaking, by reacting an organic polyisocyanate with an aqueous solution of an alkali metal silicate optionally also with a water-binding component present.

It is known that polyurethane or polyurea plastics or elastomers can be produced from organic polyisocyanates and organic compounds containing reactive hydrogen atoms which react with —NCO groups. The properties of this class of polymers vary widely. High strength, elasticity and abrasion resistance are particularly valuable properties of these products. On the other hand, their heat stability and in particular their permanent dimensional stability at temperatures above 120° C are only moderate. The use of these products as building and structural elements is limited on account of their unfavorable flame resistance. Although their flame resistance can be improved through the incorporation of flame proofing agents, their mechanical properties are generally adversely affected in this way.

It is also known that inorganic silica-gel materials can be prepared from aqueous solutions of alkali silicates by the action of acids or precursors of acids such as anhydrides. Materials of this kind have acquired particular significance as adhesives, surface-coatings and the like. Lightweight foams have also been produced on the basis of waterglass. Products such as those show high dimensional stability under heat and are completely non-inflammable. However, they are brittle and of fairly limited strength. As foams they have no real load-bearing capability and crumble under pressure. It would be extremely desirable to combine in one product the favorable properties of the inorganic materials and of organic plastics materials and to eliminate the undesirable properties of both.

The fire characteristics of the polyurethane elastomers are in many cases still unsatisfactory. This applies particularly to open-cell light-weight foams owing to their unfavorable surface/mass ratio. Many attempts have been made in the past to improve the fire characteristics of these foams, for example by adding halogen and/or phosphorus compounds or by means of special structural features such as thermolabile bonds which when exposed to fire cause the foam to melt and thereby drastically reduce the surface. Furthermore, antimony compounds, for example, and inorganic salts and fillers such as calcium carbonate, barium sulphate or zinc borate and the like may be added.

Such additions to the elastomer formulations often do in fact reduce the flammability or even cause spontaneous extinction of a small ignited test sample. However, in large test samples or in the sort of fire which would occur in practice, they are often unsatisfactory because of the high temperatures which occur. The main disadvantage of inorganic fillers is that they do not contribute to the advantageous properties of the products but merely "dilute" the organic matrix. Furthermore, they frequently act as wicks which may even promote the spread of fire.

Another difficulty when adding inorganic materials and especially those which are very hard and therefore abrasive lies in the conventional techniques for producing foams. The high pressure piston pumps normally used cannot deliver viscous products which contain fillers or deliver them only with great difficulty and not in exact amounts. Moreover, additional mixing apparatus are necessary to effect homogeneous distribution of the fillers in the polyol.

There has been no shortage of attempts to produce composite organic-inorganic plastics although none of these attempts has ever reached the required objective.

For example, polyurethanes have been mixed with active silica as a filler and subsequently the resulting mixture has been vulcanized as in U.S. Pat. No. 3,395,129. There are some signs in this case of a strengthening effect, as in cases where highly active carbon black is used. The tensile strength and the modulus increase while the breaking elongation decreases. However, the basic property spectrum of the material is not affected by the use of silica, probably because there is a two-phase system in which only the polyurethane forms a coherent phase while the silica is incorporated therein as an incoherent phase. The incoherent zones have diameters of the order of 3 to 100 microns. Accordingly, the known two-phase systems are relatively coarse, heterogeneous two-phase systems. The interaction between the two phases is very limited both on account of the relatively small interface and because of the very different chemical nature of the two phases. Moreover the addition of finely divided solid inorganic fillers increases the viscosity of the reaction mix considerably which is undesirable, especially in the case of foam production.

It is also known to use silica in plastics in the form of microfibers. In this case, the strengthening effect increases by virtue of the specific structure although, on the other hand, the incoherent phase inevitably becomes larger so that the chemical interaction between the two phases decreases. But none of the foregoing alters the coarse heterogeneous two-phase character of the plastic.

In addition, it has been proposed in U.S. Pat. No. 3,607,794 to react an aqueous solution of an alkali silicate with a monomeric polyisocyanate, for example 4,4'-diphenylmethane diisocyanate. In most cases, this reaction gives foams in which the isocyanate phase reacts with the water and the carbon dioxide formed foams the mass, some of the carbon dioxide reacting only with the immediately adjacent aqueous silicate phase to give some gel formation but inadequate penetration to give complete uniform gelling.

The reaction is preferably carried out with a predominant quantity of waterglass so that a mixture is formed which is an emulsion of the isocyanate in a coherent silicate solution. Accordingly, the resulting foam is in character a silicate foam which contains incoherent foamed polyurea zones. The properties of a foam of this kind are not really any different from those of a pure silicate foam. In fact, foams produced in this way have the disadvantage of being generally highly water retentive, brittle and of insufficient mechanical strength for their gross density to be suitable for use as construction materials, for example, foam concrete.

Although the organic polyisocyanate which is added to the silicate solution acts as a hardener, it has little effect upon the properties of the foam formed. Any effect it may have is frequently a negative effect. Obviously, in the final product the organic portion is present substantially as a filler in the completed silicate skeleton.

On the other hand, when an excess of polyisocyanate is used in the process of U.S. Pat. No. 3,607,794 polyurea foams containing a dispersed incoherent silicate phase are obtained. Accordingly, the properties are substantially those of a silica-filled polyurea foam with high flammability and extreme brittleness.

If the teaching of U.S. Pat. No. 3,607,794 is followed, it can be seen that mixtures of aqueous silicate solution and organic polyisocyanates form only relatively coarse-particle emulsions. Although this disadvantage can be reduced to a large extent by the recommended use of surfactants which make the primary emulsions more finely divided and stable, the property spectrum still remains unsatisfactory. While the surfactants effect a reduction in particle size, the use of surfactants leads to poor compression strength in the final products. In particular, composite materials obtained show pronounced brittleness and limited compression strength. It must be concluded from the results hitherto obtained that composite foams of silicates and organic materials do not have any decisive advantages over pure organic or pure inorganic materials.

It has been also proposed in French Pat. Nos. 1,362,003 and 1,419,552 to use polyisocyanates, alkali metal silicates and polyether or polyester resins to make foams but the resulting rigid products, like those produced in accordance with U.S. Pat. No. 3,607,794 are brittle and have low compression strength. Flexible products made in accordance with these French patents have poor tensile strength.

It is also known that aggregates can be produced from mineral granules and synthetic resins. Processes for producing synthetic resin concrete from porous mineral materials and mixtures which are capable of foaming are known in the art (German Auslegeschrift No. 1,239,229).

In these cases, the mineral material is always included within and bonded together by synthetic resin. Synthetic resin concretes produced in this way have, however, the disadvantage of not being homogeneous so that they are subjected to different degrees of mechanical stress in different zones. Moreover, it is often necessary to use considerable quantities of more than about 30% by weight of an organic synthetic resin which is not only expensive but which also, in most cases, reduces the flame resistance.

It is already known that concrete conventionally used for building purposes can be diluted by the addition of organic porous synthetic resins such as foamed polystyrene and it is also known to add blowing agents such as air to concrete mixtures or to produce gases in situ by adding, for example, aluminum which evolves hydrogen by reactions with the water-cement mixture, in order to obtain porous materials with low gross densities.

The disadvantages of those substantially inorganic materials are their relatively long setting times, their relatively high brittleness and their low thermal insulation, compared with organic foam structures.

It is also known to produce structural elements from porous organic synthetic resins with solid, fire-resistant covering layers which are in most cases inorganic or metallic.

Owing to their organic nature, these materials have the disadvantage that they cannot be used as building materials without fire-retarding covering layers.

It is also known to produce cement masses from hydraulic cement, a non-aqueous silica filler such as sand and an organic compound which contains a plurality of isocyanate groups (German Offenlegungsschrift No. 1,924,468). The main disadvantages of these porous cement masses is that they still have comparatively long setting times of 5-6 hours and poor thermal insulation properties.

Heat-resistant foams can be obtained from thermoplastic synthetic resins which can be foamed or are already cellular by working them up in the presence of aqueous alkali metal silicate solutions (German Auslegeschrift No. 1,494,955). The disadvantages of this process are the large heat supply required to foam the thermoplastic resin, the problem of hardening the alkali metal silicate solutions and the water content of the resulting composite material.

It is an object of the invention to provide improved inorganic-organic compositions which are devoid of the foregoing disadvantages. Another object of the invention is to provide inorganic-organic compositions of high strength, rebound elasticity and dimensional stability even at high temperatures which are substantially non-inflammable.

A more specific object of the invention is to obviate the above described disadvantages of known foam materials and to produce an organic-inorganic foam material which combines the advantages of rapid setting times, high compression strength compared to the gross density, high thermal and acoustic insulation, high-flame resistance and excellent resistance to fire.

A still further object of the invention is to provide flexible inorganic-organic plastics or elastomers having a low calorific effect and improved fire resistance.

Another object of the invention is to provide novel organic polyisocyanates containing a phenolic hydroxyl group and organic-inorganic plastics made therefrom.

The foregoing objects and others which will become apparent from the following description are accomplished in accordance with the invention, generally speaking, by providing an inorganic-organic composition obtained from a mixture of components containing:
  (a) from 5-98% by weight of an organic polyisocyanate;
  (b) from 2-95% by weight of an aqueous alkali metal silicate solution containing about 20-70% by weight of said alkali metal silicate; and
  (c) from 0-93% by weight of a water-binding component based on the total weight of a), b) and c) with the proviso that when c) is 0-20% by weight a) contains 2-200 milliequivalents of ionic groups per 100 grams of said polyisocyanate.

It is preferable, but not essential because any excess water-binding component could serve as only filler material, to have at least enough water present in the reaction mixture to combine with substantially all of said water-binding component. If desired an additional amount of water may be added.

Thus, a product and process, therefor, has now been found by which it is possible to produce macroscopically completely homogeneous inorganic-organic compositions which are xerosol materials of the solid/solid type, similar to the known ABS-plastics, in their colloidal nature, but have entirely different properties.

Xerosols are dispersions of solid or liquid materials in a coherent solid. The completely new composite materials obtained in this way are extremely high-quality compositions which are advantageously distinguished in their properties from pure organic or pure inorganic materials. They are distinguished in particular by high strength, rebound elasticity, dimensional stability under heat and substantial non-inflammability.

It has surprisingly been found that these inorganic-organic materials of high strength, rebound elasticity, dimensional stability when heated and substantial non-inflammability can be obtained by homogeneously mixing said polyisocyanate with said aqueous solutions of alkali silicates, if required with the appropriate amount of said water-binding component present, and allowing the sol formed to react to form a xerosol. The colloidal dispersion and mutual penetration of the two phases is believed to be an essential criteria, making possible high specific surface and interfacial interactions such as are characteristic of xerosols. Best properties are obtained with the organic phase being continuous.

By using the organic polyisocyanate containing an ionic group including, for example, isocyanate prepolymer ionomers, i.e. polyurea polymer precursors containing anionic and/or cationic groups, it is possible to obtain such a homogeneous dispersion of the organic and aqueous inorganic phases that sols are initially formed in which the disperse phase is present in dimensions of from about 20 nanometers (nm) to 2 microns, preferably from 50 nm to 700 nm, so that the chemical interactions increase by orders of magnitude and novel composite materials are obtained in which the disperse phase generally has dimensions of the order of from 20 m$\mu$ to 100 $\mu$, preferably from 100 m$\mu$ to 10 $\mu$. The organic and inorganic phase need not necessarily be completely incompatible with each other, for example to the extent that they will not mix at all. In fact it is preferably to use mixtures which have a limited compatibility with each other as this facilitates emulsification. In particular, it is also possible by using the polyisocyanates containing ionic groups to obtain a colloidal fiber structure so that both phases can be present as coherent systems. This means that a macroscopically and, in many cases, even a microscopically homogeneous composite material is obtained which combines the advantages of inorganic and organic compositions. Whether the water-binding component is present or not, it is strongly preferred to employ organic polyisocyanates containing ionic groups.

Accordingly, the present invention also relates to a process for the production of inorganic-organic compositions of high strength, rebound elasticity, dimensional stability even when hot and substantial non-inflammability which is a polyurea ionomer-polysilicic acid gel composite material in the form of a colloidal xerosol, wherein an aqueous silicate solution is combined with
 (a) an organic polyisocyanate
 (c) a water-binding component (i.e. another compound which hardens the water-soluble silicates), in the amounts and with proviso set forth above; and
 (b) optionally further auxiliaries and additives,
and the system thus obtained is allowed to react to completion.

The inorganic-organic composition of one preferred embodiment of the invention is distinguished by the fact that in addition to high molecular weight silicate, the resulting high molecular weight organic polyurea of the composite material contains substantially from 2 to 200 milliequivalents per 100 g of chemically bound ionic groups.

It has also been found that under certain conditions polyisocyanates and alkali metal silicate solutions can even be used to produce flexible products, in other words products which for example have a Shore hardness A of 40 to 95 and an elongation at break of 100 to 800 combined with high elasticity. These flexible products have excellent fire characteristics even as foams and moreover they can easily be prepared as liquid components in the usual manner.

This invention also provides a process for producing flexible inorganic-organic plastics which have a low calorific value and improved fire characteristics by reacting a reaction mixture containing a compound having Zerewittinoff-active hydrogen atoms, an organic polyisocyanate, an aqueous alkali metal silicate solution and optionally other auxiliary agents and additives, in particular blowing agents, and water-binding fillers, wherein the reaction mixture contains (d) about 30 to about 70 percent by weight of one or more organic compounds with Zerewittinoff-active hydrogen atoms which have an average molecular weight of about 400 to about 6000, preferably about 1000 to about 6000, and a glass temperature below 10° C, preferably below −20° C;

(a) about 10 to about 30 percent by weight of an organic polyisocyanate; and (b) about 20 to about 60 percent by weight of an aqueous alkali metal silicate solution which has a solids content of between 30 and 70 percent by weight, in which components a) and d) may also be in the form of reaction products of the two components, and optionally other auxiliary agents and additives.

The following proportions by weight of the components in the mixture for making a flexible product are particularly preferred:
 (d) 45 to 70 percent by weight,
 (a) 10 to 30 percent by weight,
 (b) 20 to 45 percent by weight.
Within these proportions, exceptionally soft and highly elastic products are obtained.

Particularly preferred for making flexible products are the reaction mixtures in which component a) contains at least a proportion of hydrophilic groups, which may be either ionic or nonionic. Furthermore, component d) should preferably be liquid at 50° C and have a glass temperature of below 10° C and preferably below −20° C and an average molecular weight of 1500 to 5000.

Any suitable organic polyisocyanate may be used. The average molecular weight of the organic polyisocyanate should preferably be between 300 and 8000 (most preferably between 400 and 5000). Suitable polyisocyanates include aliphatic, cycloaliphatic, araliphatic, aromatic or heterocyclic polyisocyanates such as those described e.g. by W. Siefken in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane (German Auslegeschrift No. 1,202,785); hexahydrotolylene-2,4- and -2,6-diisocyanate and any mixtures of these isomers; hexahydrophenylene-1,3- and/or -1,4-diisocyanate, perhydrodiphenylmethane-2,4'- and/or -4,4'-diisocyanate; phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4"-triisocyanate; polyphenyl-polymethylene-polyisocyanates which may be obtained by aniline-formaldehyde condensation followed by phosgenation and which have been described e.g. in British Patent Specification Nos. 874,430 and 848,671; perchlorinated aryl polyisocyanates such as those described e.g. in U.S. Pat. No. 3,277,138; polyisocyanates which contain carbodiimide groups as described in U.S. Pat. No. 3,152,162; the diisocyanates described in U.S. Pat. No. 3,492,330, polyisocyanates which contain allophanate groups as described e.g. in British Pat. Specification No. 994,890; Belgian Pat. Specification No. 761,626 and published Dutch Pat. Application No. 7,102,524; polyisocyanates which contain isocyanurate groups as described e.g. in German Pat. Specification Nos. 1,022,789; 1,222,067 and 1,027,394 and in German Offenlegungsschriften Nos. 1,929,034 and 2,004,048; polyisocyanates which contain urethane groups as described e.g. in Belgian Pat. Specification No. 752,261 or in U.S. Pat. No. 3,394,164; polyisocyanates which contain acylated urea groups in accordance with U.S. Pat. No. 3,517,039; polyisocyanates which contain biuret groups as described e.g. in U.S. Pat. No. 3,124,605; in British Pat. Specification No. 889,050 and in U.S. Ser. No. 036,500 filed May 11, 1970; polyisocyanates prepared by telomerization reactions as described e.g. in Belgain Pat. Specification No. 723,640; polyisocyanates which contain ester groups as described e.g. in British Pat. Specification Nos. 965,474 and 1,072,956; in U.S. Pat. No. 3,567,763 and in German Pat. Specification No. 1,231,688 and reaction products of the above mentioned isocyanates with acetals in accordance with U.S. Pat. No. 3,120,502.

The distillation residues which still contain isocyanate groups obtained from the commercial production of isocyanates are preferred and may be dissolved in one or more of the above mentioned polyisocyanates. Any mixtures of the above mentioned polyisocyanates may also be used.

It is generally preferred to use commercially readily available polyisocyanates such as polyphenyl-polymethylene-polyisocyanates obtained by aniline-formaldehyde condensation followed by phosgenation ("crude MDI") and polyisocyanates which contain carbodiimide groups, urethane groups, allophanate groups, isocyanurate groups, urea groups or biuret groups ("modified polyisocyanates").

The isocyanate group can also be present in masked form for example, as a uretdione or caprolactam adduct. The polyisocyanates used in the process according to the invention preferably contain from about 2 to 10 more preferably from 2.2 to 4 isocyanato groups.

It is preferred to use polyisocyanates which contain ionic groups and it is particularly preferred to use polyisocyanates which contain sulphonic acid and/or sulphonate groups.

These isocyanates are prepared by a process in which liquid mixtures of aromatic polyisocyanates which have an isocyanate content of 10-42% by weight and a viscosity of 8-10,000, preferably 50-10,000 cP at 25° C are mixed with 0.1 to 10% by weight of sulphur trioxide or an equivalent quantity of oleum, sulphuric acid or chlorosulphonic acid at −20° C to +200° C and left until the reaction is completed, and the sulphonation products obtained in this way may then be partly or completely neutralized with a basic compound if desired (U.S. Ser. No. 363,436 filed May 24, 1973, now abandoned).

The ionic group content should amount to between 2 and 200 milliequivalents per 100 g of polyisocyanate. The ionic group content is more preferably between 3 and 100 milliequivalents per 100 g of polyisocyanate.

Suitable organic polyisocyanates also include prepolymers obtained by the so-called isocyanate-polyaddition process of the kind which have been repeatedly described over recent years. It is no problem to control virtually any known isocyanate reaction so that it can be stopped at least temporarily at a prepolymer stage. The prepolymers include not only adducts of polyisocyanates with alcohols, mercaptans, carboxylic acids, amines, ureas and amides, but also reaction products of the foregoing polyisocyanates with themselves, such as uretdiones, isocyanates, carbodiimides which can readily be obtained from monomeric polyisocyanates with an increase in molecular weight.

NCO-prepolymers particularly suitable for the process according to the invention are prepared by methods known per se, for example, by reacting polyhydroxyl compounds with a molecular weight of from about 400 to 5000, more especially polyhydroxyl polyesters and polyhydroxypolyethers, if desired in admixture with polyhydric alcohols with a molecular weight of less than 400, with excess quantities of polyisocyanates, for example hexamethylene diisocyanate, 2,4-tolylene diisocyanate, 2,6-tolylene diisocyanate, 4,4'-diisocyanatodiphenylmethane, etc.

In order to guarantee the required high compatability of the organic polyisocyanates with the aqueous silicate solution in the absence of at least 20% by weight of a water-binding component, it is necessary for the organic polyisocyanate to contain ionic groups and even a very low ionic group content is actually sufficient, for example, to have 2 milliequivalents of ionic groups/100 g of said organic polyisocyanate. The ionic group content preferably amounts to 3-100 milliequivalents/100 g. Ionic groups are not only preformed salt groups, such as for example

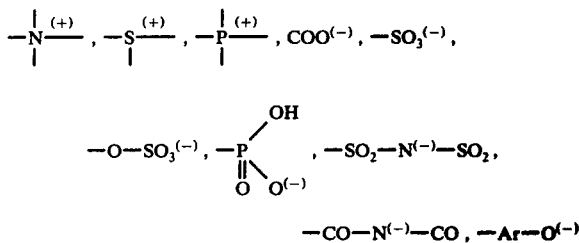

—CO—N$^{(-)}$—CO, —Ar—O$^{(-)}$ wherein Ar is $C_6$-$C_{14}$ aryl such as phenyl, naphthyl and the like, but also groups of the kind which form salt groups in the presence of alkali silicate, for example

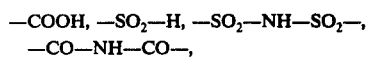

and also phenolic OH-groups. Two or more of the aforementioned groups can of course also be present. Organic polyisocyanates containing an anionic and a cationic group in the same molecule or complexes containing anionic and cationic polyisocyanates at the same time, can also be present.

Particularly preferred ion-forming groups are tert.-

—COOH, —SO₃H, —Ar—OH wherein Ar has the above meaning. Of these, the tertiary amino group has to be converted into a quaternary ammonium group before combination with the alkali silicate solution, for which purpose alkylating agents and also inorganic or organic acids are suitable.

Ionic modification carried out in the usual way gives polyisocyanates which frequently have a viscosity of greater than 10, preferably greater than 50 cP and, in some cases, up to 100,000 cP/25° C and higher. In cases where viscosities as high as these are a disadvantage in further processing, the viscosity can be reduced by using low-viscosity isocyanates or even by adding inert solvents such as acetone, diethyl ether of diethylene glycol, ethyl acetate and the like. In addition, the duration of the hardening process can be extended by combining polyisocyanates containing ionic groups with conventional low-viscosity isocyanates.

Particularly preferred polyisocyanates are prepared by sulphonating aromatic polyisocyanates. In the simplest case, it is sufficient to react the polyisocyanates with concentrated sulphuric acid or oleum or sulfur trioxide. These products can either be directly mixed with aqueous silicate solutions, in which case the corresponding metal salt is formed in situ. However, the sulphonation product can also be completely or partly neutralized at the outset, for example by the addition of amines such as triethyl amine, trimethyl amine, methyl morpholine, pyridine, dimethyl aniline, metal alcoholates, for example Na-tert.-butanolate, K-isopropanolate and the like. Neutralization can also be carried out with metal oxides, hydroxides or carbonates either in solid form or suspended in diluents. Calcium oxide, magnesium oxide, calcium carbonate, magnesium carbonate and dolomite, for example, are particularly suitable.

Non-volatile, relatively high molecular weight tertiary amines are also particularly suitable for neutralization because they do not evaporate with the alkali silicate solution during the subsequent reaction. Products of this kind are, in particular, alkoxylation products of primary or secondary amines or even polyesters or polyacrylates with tert.-nitrogen atoms, also the known condensation products based on epichlorhydrin and polyamines of the kind used for example, for increasing the wet-strength of paper. It is preferred to use polycondensation products of weakly basic or sterically hindered amines because otherwise an excessive increase in viscosity can occur where polyamines are used.

The selection of suitable neutralizing agents is also determined by whether the neutralized or partially neutralized ionic polyisocyanate is to remain stable in storage over a prolonged period or whether it is to be reacted immediately with the alkali silicate solution to form the polyurea ionomer-silica gel. In the latter case, tertiary-amines of the kind which still contain reactive groups such as —OH, —NHR, —CO—, —NH₂, can also be safely used for neutralization. On account of the limited storage stability of the organic polyisocyanate which still contains reactive groups such as hydroxy groups, free non-neutralized carboxy-, urethane- and urea groups, it is generally advisable to prepare these modified isocyanates just before reaction. To produce storagestable organic polyisocyanates, groups of this kind should be blocked beforehand by reaction, for example with monoisocyanates.

Ionic modification may be carried out, for example, by jointly using a tertiary aminoalcohol such as dimethylaminoethanol or N-methyl diethanolamine, followed by quarternization with an alkylating agent. A salt of an amino acid or of an aminosulphonic acid for example can be used for anionic modification. Carboxy diols such as tartaric acid, dimethylolpropionic acid or adducts of acid anhydrides and their salts can also be used for the preparation of ionic organic polyisocyanates.

However, modified organic polyisocyanates known per se, as well as the prepolymers taught above, especially those based on aromatic polyisocyanates, can also be subsequently modified to give ionic groups, for example by reaction with sultones, β-lactones, by grafting on acrylic acid, methacrylic acid or crotonic acid, for example, or by sulphuric acid, chloro-sulphonic acid, oleum or sulphur trioxide. In particular, organic polyisocyanates containing ionic groups eminently suitable for the process according to the invention, generally with high stability in storage, can also be obtained by reacting aromatic polyisocyanates, such as tolylene diisocyanates, diphenylmethane diisocyanates and the known phosgenation products of the condensation products of aromatic monoamines, especially aniline and aldehydes, especially formaldehyde, with sulphuric acid, oleum or sulphur trioxide. Sulphonated polyisocyanates of this kind which generally still contain uretdione-, urea-, biuret, and, in particular where polyol modification has been carried out before sulphonation, urethane- and/or allophanate groups which are formed through secondary reactions during sulphonation and which can still be detected by IR-spectroscopy, are therefore particularly preferred as polyisocyanates containing ionic groups.

However, it is even better to use mixtures of di-, tri- and higher polyisocyanates, for example, phosgenation products of aniline/formaldehyde condensation products which are characterized by a viscosity of from 50 to 10,000 preferably from 100 to 5000 centipoises at 25° C for sulphonation.

As previously mentioned, the —NCO prepolymers referred to above may also be modified to include ionic groups, for example, reaction products of 50 to 99 mols of aromatic diisocyanates with 1 to 50 mols of the usual glycols, monoamines, polyether glycols, polythioether glycols, polyester glycols, and the like. In this case, the ionic center can be introduced by the joint use of suitable glycols or even for example by subsequent sulphonation, grafting on ethylenically unsaturated acids such as, for example, acrylic acid, maleic acid or crotonic acid, by reaction with sultones, β-lactones, or by other methods known per se.

Further, it can be said that the —NCO terminated prepolymer ionomers used, for example, for the production of aqueous polyurethane dispersions (U.S. Pat. No. 3,756,992) can be used for the process according to the invention.

Other suitable organic polyisocyanates are liquid aromatic polyisocyanates containing carboxyl and/or carboxylate groups, prepared by reacting liquid mixtures of aromatic polyisocyanates which have an isocyanate content of 10% to 42% by weight and a viscosity of 8 cP to 10,000 cP at 25° C with
  (i) compounds which contain carboxylate groups and hydrogen atoms which are reactive with isocyanate groups or
  (ii) hydroxycarboxylic or mercaptocarboxylic acids such that
    (1) during or after the isocyanate addition reaction, the carboxyl groups are at least partly converted into the corresponding carboxylate groups by neutralization with a base or
    (2) the hydroxycarboxylic or mercaptocarboxylic acids used are of the kind in which the carboxyl groups are much less reactive with isocyanate groups than are the hydroxy or mercapto groups,
the quantitative proportions of the reactants being chosen so that the products of the process will have an isocyanate content of 10% to 40% by weight and a carboxyl or carboxylate group content of 0.1 to 10% by weight.

Liquid mixtures of aromatic polyisocyanates suitable for reacting with component i) or ii) to make polyisocyanates containing carboxyl groups are, in particular, those with an isocyanate content of 10% to 42% by weight, preferably 18% to 35% by weight, and a viscosity of 8 cP to 10,000 cP, preferably 50 cP to 5000 cP at 25° C.

The liquid aromatic polyisocyanate mixtures used for making the liquid organic polyisocyanates containing carboxyl groups are preferably the phosgenation products of aniline/formaldehyde condensates which contain 20% to 80% by weight of dinuclear diisocyanates, 8% to 40% by weight of trinuclear triisocyanates, 3% to 20% by weight of tetranuclear tetraisocyanates and 2% to 40% by weight of higher nuclear polyisocyanates. Polyisocyanate mixtures of this kind generally have a viscosity above 50 cP at 25° C. Those phosgenation products which have a viscosity of 100 cP to 2000 cP at 25° C are particularly suitable.

Another liquid mixture of aromatic polyisocyanates which may be used as a starting material in making the polyisocyanate having carboxyl groups is a phosgenation product of aniline/formaldehyde condensates containing 30% to 100% by weight of dinuclear diisocyanates, of which at least 10% is made up of 2,2'- and/or 2,4'-isomers, 0% to 20% by weight of trinuclear triisocyanates and 0% to 4% by weight of tetranuclear and higher nuclear polyisocyanates. Mixtures of 40% to 90% of a phosgenation product of aniline formaldehyde condensates containing 70% to 100% (in particular 81% to 95%) of dinuclear isocyanates and 10% to 60% of tolylene diisocyanate are also particularly suitable. The first runnings obtained from the commercial distillation of phosgenation products of aniline formaldehyde condensates, containing 20% to 80% of 2,2'- and 2,4'-diisocyanatodiphenylmethane, are also eminently suitable. These products have an exceptionally low viscosity of about 8 cP to 50 cP at 25° C. Owing to the fact that they contain isocyanates with isocyanate groups in the ortho-position, these mixtures can be modified with carboxyl groups without sedimentation in spite of their low viscosity.

The commercial distillation residues which are obtained from the distillation of commercial tolylene diisocyanate mixtures and which contain less than 50% by weight of free tolylene diisocyanate isomers are also eminently suitable for making the polyisocyanates containing carboxyl groups. Distillation residues of this kind can be obtained, for example, by the process according to U.S. Ser. No. 161,817 filed July 12, 1971, now abandoned. The distillation residues described in German Patent Application No. P 21 23 183.4 as well as their solutions in the phosgenation products of aniline formaldehyde condensates which are also described in the last mentioned German Patent Application are also particularly suitable.

Other suitable isocyanate components for making polyisocyanates containing carboxyl groups include the phosgenation products of condensates of aniline and aldehydes or ketones such as acetaldehyde, propionaldehyde, butyraldehyde, acetone or methyl ethyl ketone, etc. The phosgenation products of condensates of anilines which are substituted with alkyl groups on the nucleus, such as toluidines, with aldehydes or ketones such as formaldehyde, acetaldehyde, butyraldehyde, acetone or methyl ethyl ketone are also suitable.

Reaction products of the above mentioned aromatic polyisocyanate mixtures with 0.2 to 25 mol % of polyols are also suitable for making polyisocyanates containing carboxyl groups provided that the viscosity of the resulting reaction products does not exceed 10,000 cP at 25° C and the isocyanate content of the reaction product is at least 10% by weight.

Suitable polyols for making polyisocyanates containing carboxyl groups are, in particular, the polyether and/or polyester polyols well known in polyurethane chemistry which have a molecular weight of 200 to 6000, preferably 300 to 4000 as well as low molecular weight polyols with a molecular weight of 62 to 200. Examples of such low molecular weight polyols include ethylene glycol, propylene glycol, glycerol, trimethylolpropane, 1,3,6-hexanetriol and the like.

Suitable starting compounds for making polyisocyanates having carboxyl groups also include the reaction products of the polyisocyanates well known in polyurethane chemistry, such as 2,4-diisocyanatotoluene, 2,6-diisocyanatotoluene or 4,4'-diisocyanatodiphenylmethane, with 1 to 25 mol % of the polyols mentioned above, the same restrictions applying as regards the isocyanate content and the viscosity of the reaction products. The starting materials used for making polyisocyanates containing carboxyl groups are, in all cases, mixtures which contain at least 2 to 3 major components.

When using the phosgenation products of aniline formaldehyde which contain an exceptionally low proportion of dinuclear isocyanates and therefore have an unfavorably high viscosity, e.g. more than 5000 cP, it may be advisable to add 1% to 30% by weight of tolylene diisocyanate or 2,4'-diphenylmethane diisocyanate in a pure or commercially crude form before or after modification with carboxyl groups, in order to lower the viscosity.

The following are specific examples of mono- and/or di- and/or polyhydroxycarboxylic acids or mercaptocarboxylic acids which are suitable for use in making polyisocyanates having carboxyl groups:

1. aliphatic or cycloaliphatic monohydroxycarboxylic acids and monomercaptocarboxylic acids, such as α-hydroxybutyric acid, hydroxypentanoic acid, lactic acid, ricinoleic acid, malic acid, citric acid, thioglycollic acid or α-mercaptopropionic acid;
2. aliphatic or cycloaliphatic dihydroxycarboxylic acids and mercaptocarboxylic acids, for example glyceric acid, trimethylolacetic acid, tartaric acid, 1,1-dimethylolpropionic acid, 1,1-dimethylolbutyric acid, dihydroxymaleic acid, dihydroxyfumaric acid or 1,2-bis-mercaptoglyceric acid;
3. aliphatic polyhydroxypolycarboxylic acids such as mucic acid, saccharic acid or tartaric acid;
4. compounds containing hydroxyl, ester and carboxyl groups obtained by reacting alkane or cycloalkane polyols with a molecular weight of 62 – 1000 with less than equivalent quantities of intramolecular carboxylic acid anhydrides.

In this context, the term "less than equivalent quantity" means that the reactants for preparing the reaction products are used in quantities such that a maximum of n minus 0.7 equivalents of carboxylic acid anhydride groups but at least 0.5 and perferably at least 0.7 equivalents of carboxylic acid anhydride groups are used per mol of n-valent polyol. The reaction products which contain hydroxyl, ester and carboxyl groups are obtained from the starting components, for example by simply heating them to 70° to 120° C for 30 to 120 minutes. In the simplest case, for example, β-hydroxyethyl-succinic acid ester is obtained from ethylene glycol and succinic acid anhydride used in a molar ratio of 1:1. From 1 mol of pentaerythritol and 3 mols of phthalic acid anhydride, a corresponding reaction product could be obtained which would have a statistical average of one hydroxyl group, three ester groups and three carboxyl groups; this could also be used for making polyisocyanates containing carboxyl groups.

Suitable polyols for preparing the polyisocyanate reaction products have a valency of $n = 2$ to 12, preferably 2 to 4. The corresponding mercaptans or mercaptoalcohols could, of course, be used instead of the polyols, although it is preferred to use polyols which are free from mercapto groups. The following are examples of suitable polyols and mercaptans: ethylene glycol; propane-1,2-diol; propane-1,3-diol; butane-1,2-diol; butane-1,3-diol, butane-1,4-diol, hexane diols, octane diols; decane diols; undecane diols; cyclohexane dimethanol; resorcinol; pyrocatechol; hydroquinone; glycerol; trimethylolethane; trimethylolpropane; trimethylolhexane; pentaerythritol; glucose; cane sugar; diethylene glycol; triethylene glycol, etc. Mercaptoalcohols such as mercaptoethanol; thioglycerol; monothio-1,1,1-trimethylol propane; monothio-1,1,1-trimethylolethane, etc. are also suitable.

Suitable carboxylic acid anhydrides are any intramolecular carboxylic acid anhydride, e.g. maleic acid anhydride; succinic acid anhydride; glutaric acid anhydride; o-phthalic acid anhydride; tetrahydrophthalic acid anhydride; hexahydrophthalic acid anhydride; the isomeric methyl- and ethyltetrahydrophthalic acid anhydrides; the isomeric methyl- and ethyl-hexahydrophthalic acid anhydrides; trimellitic acid anhydride; endomethylene-tetrahydrophthalic acid anhydride; 4-chlorophthalic acid anhydride; 4-bromophthalic acid anhydride; 1,4,5,6,7,7-hexachloro-bicyclo-(2,2,1)-heptane-5-dicarboxylic acid-(2,3)-anhydride and diglycollic acid anhydride.

Carboxylic acid anhydrides of polycarboxylic acids which have the carboxyl groups adjacent to each other, i.e. in the 1,2-positions, are preferred, e.g. maleic acid anhydride; succinic acid anhydride; phthalic acid anhydride; tetrahydrophthalic acid anhydride; hexahydrophthalic acid anhydride and the like.

The proportions in which the reactants are used are chosen so that the products of the process contain 0.1% to 10% by weight, preferably 0.5% to 3.5% by weight of carboxyl groups and 10% to 40% by weight, preferably 18% to 35% by weight of isocyanate groups. The reaction may be carried out without solvents at 0° to 150° C, preferably 60° to 130° C, after mixing the reactants. In special cases, the reaction may also be carried out in the presence of small quantities (1% to 10% by weight) of solvents. The solvents should be inert towards both the isocyanate groups and the modifying agents which contain carboxyl groups. The solvents, if used are preferably aromatic or polar solvents such as ethers, esters, ketones or halogenated hydrocarbons with a boiling point between 60° and 140° C. The reaction time depends on the reaction temperature and the reactivity of the isocyanate groups or of the hydroxyl or mercapto groups. The time required to complete the reaction may vary from a few minutes to about 3 hours. If desired, the reactants may simply be mixed at room temperature and left to react, especially when using low viscosity isocyanates.

Further information regarding the preparation of suitable organic polyisocyanates containing carboxyl and/or carboxylate groups is found in copending application for U.S. Pat. application Ser. No. 527,389 filed Nov. 26, 1974, now U.S. Pat. No. 3,959,348.

Organic polyisocyanates which contain phenolic hydroxyl groups are eminently suitable for reaction with polar inorganic media, particularly aqueous media, in accordance with this invention. They are particularly suitable for the production of organic/aqueous diphasic systems within a basic pH range.

Organic polyisocyanates which contain phenolic hydroxyl groups suitable for use in the invention may be prepared by reacting an organic polyisocyanate with a phenol which, in addition to at least one phenolic hydroxyl group, contains at least one group which is not only reactive with isocyanate groups but has a higher reactivity with isocyanates than the aforementioned phenolic hydroxyl group, the reactants being used in such proportions that the reaction mixture contains an at least 200% molar excess of isocyanate groups over the groups which react with them more readily than the aforementioned phenol group.

The invention also provides polyisocyanate mixtures which are characterized by
(1) an isocyanate content of 3–45 percent by weight,
(2) an average isocyanate functionality of 1.8–4.0 and
(3) a phenolic hydroxy group content of 0.01–5 percent by weight.

These polyisocyanate mixtures may be used as coating and impregnating agents for inorganic substrates.

The organic polyisocyanates desired hereinbefore are suitable starting materials for making the polyisocyanates which contain phenolic hydroxyl groups. As set forth above they may be aliphatic, cycloaliphatic, araliphatic, aromatic or heterocyclic polyisocyanates those described e.g. by W. Siefken in Justus Liebigs Annalen der Chemie, 562, pages 75 to 136.

The phenols reacted with an organic polyisocyanate contain in addition to at least one phenolic hydroxyl group at least one group which is more reactive with isocyanate groups than the aforementioned phenolic hydroxyl group. The following are examples of such compounds: polyphenols such as pyrocatechol; resorcinol; hydroquinone; 4-acetyl-resorcinol; 4-ethyl-resorcinol; 4-hexyl-resorcinol; 4-chloro-resorcinol; 2-nitro-resorcinol; 2,2-bis-[4-hydroxyphenyl]-propane; 2,2-bis-[4-hydroxy-3-methyl-phenyl]-propane; 2,2-bis-[4-hydroxyphenyl]-cyclohexane; 1-phenyl-1,1-bis-[4- hydroxyphenyl]-ethane; 2,2-bis-[4-hydroxyphenyl]-1,1,1-trichloro-ethane; methylene-bis-mesitol; 2,4,6,2',4',6'-hexachloro-3,3'-dihydroxy-diphenyl sulphide; bis-(4-(hydroxyphenyl)-sulphone; 4-tert.-butyl-pyrocatechol; 1,5-dihydroxy-naphthalene; 1,6-dihydroxy-naphthalene; 1,7-dihydroxy-naphthalene; 2,3-dihydroxy-naphthalene; 2,6-dihydroxy-naphthalene; 2,7-dihydroxy-naphthalene; 2,2'-dihydroxy-diphenyl; 3,5,3',5'-tetrachloro-2,2'-dihydroxy-diphenyl; 4,4'-dihydroxy-diphenyl; bis-(5-chloro-2-hydroxy-phenyl)-methane; 1,1-bis-(4-hydroxyphenyl)-ethane; 2,2-bis-(3,5-dichloro-4-hydroxyphenyl propane); 2,2'-dihydroxy-1,1'-dinaphthyl; bis-(2-hydroxy-1-naphthyl)-methane; pyrogallol; phloroglucinol; salicyclic acid; 5-chloro-2-hydroxy-benzoic acid; 3-hydroxy-benzoic acid; 4-hydroxy-benzoic acid; 3-chloro-4-hydroxy-benzoic acid; 5-nitrosalicylic acid; 3-nitrosalicylic acid; 3-nitro-4-hydroxy-benzoic acid; 2-hydroxy-3-methyl-benzoic acid; 5-chloro-2-hydroxy-3-methyl-benzoic acid; 6-hydroxy-3-methyl-benzoic acid; 6-hydroxy-3-tert.-butyl-benzoic acid; 2-hydroxynaphthalene-1-carboxylic acid; 1-hydroxynaphthalene-2-carboxylic acid; 2,4-dihydroxy-benzoic acid; 3,5-dihydroxy-benzoic acid; 2-aminophenol; 4-chloro-2-aminophenol; 4,6-dichloro-2-aminophenol; 3,4,6-trichloro-2-aminophenol; 4-nitro-2-aminophenol; 4-chloro-6-nitro-2-aminophenol; 3-aminophenol; 3-hydroxy-diphenylamine; 6-chloro-3-aminophenol; 3-hydroxy-2'-methyldiphenylamine; 4-hydroxy-m-phenylenediamine; 4-amino-2-hydroxy toluene; 5-amino-2-hydroxy toluene; 6-amino-3-hydroxy toluene; 2-amino-4-hydroxy toluene; 2-ethylamino-4-hydroxy toluene; 3-amino-4-hydroxy toluene; 5-amino-1-hydroxy naphthalene; 6-amino-1-hydroxy naphthalene; 1-amino-2-hydroxy naphthalene; 3-amino-2-hydroxy naphthalene; ethyl-(3-amino-4-hydroxy phenol)-sulphone and the like.

Low-molecular weight adducts or condensates of phenols with aliphatic aldehydes, particularly with formaldehyde, acetaldehyde and chloral are also suitable modifying agents, e.g. dimethyl-p-cresol and commercial hydroxymethyl phenols, novolaks and resols which may also be partly oxalkylated. If such polyfunctional products are used, however, care must be taken to insure that no chain-lengthening to high-molecular weight products let alone crosslinking takes place. The quantity used, based on the polyisocyanate, is therefore small and generally not more than 5 percent by weight.

The phenols preferably reacted with the organic polyisocyanate in the process according to the invention are those which,
1. in addition to containing a sterically hindered phenolic hydroxyl group have at least one sterically unhindered group which is reactive with isocyanate groups, in particular a carboxyl-, primary or secondary amino- or aliphatic hydroxyl group or in which
2. the phenolic hydroxyl group and the other group which is reactive with isocyanate groups are in the ortho- or meta-position to each other so that, after termination of the reaction of the other group which is reactive with isocyanate groups, the phenolic hydroxyl group will be sterically hindered by the resulting substituted urethane-, urea- or carbonamide group in the ortho- or meta-position.

Examples of the preferred reactants mentioned under 1 include (2-hydroxyethyl) salicylate, 3-chloro-4-hydroxybenzylic acid and 2,6-di-tert.-butyl-4-aminophenol. Examples of the preferred compounds mentioned under 2 include pyrocatechol; resorcinol; 2-aminophenol; 1,2-dihydroxy naphthalene and 1-amino-2-hydroxy naphthalene. o- and m-bis-phenols are particularly suitable reactants for polyisocyanates in the process according to the invention because the phenolic hydroxyl groups of bis-phenols also have differing reactivities towards isocyanate groups (the first hydroxyl group always reacts more rapidly than the second) and particularly because, when the polyisocyanate has reacted with the first phenolic hydroxyl group, the urethane group introduced in this way has a powerful sterically hindering effect on the second hydroxyl group.

Among the phenols listed as examples above, those in which the second reactive group (the group other than the aforementioned phenolic hydroxyl group) differs little in its reactivity towards isocyanate groups from the aforementioned phenolic hydroxyl group are less advantageous. The only reason why the two phenolic hydroxyl groups of hydroquinone, for example, differ in their reactivity towards isocyanate groups is that in bisphenols the first hydroxyl group is always more reactive than the second. Since the second hydroxyl group, however, is not sterically hindered by the urethane group introduced into the molecule, a compound such as hydroquinone is not suitable for the production of phenol- and isocyanate-containing compositions which are required to be stable in storage. Compounds of this kind such as hydroquinone mentioned as example above are therefore used in the process according to the invention only in cases where the products are not required to be stable in storage because they will in any case be used soon after they have been prepared. In practice, this low stability in storage is not a disadvantage because the process according to the invention is very easy to carry out and there is therefore generally no problem in producing the products shortly before they are required. On the other hand if the special phenols mentioned under 1 and 2 are used, the systems with isocyanate and phenolic hydroxyl groups obtained by the process according to the invention are stable in storage.

To make an organic polyisocyanate containing a phenolic hydroxyl group, the reactants may be mixed at 0° to 140° C, preferably 15° to 50° C, and left to react at this temperature. Reaction products which contain phenolic hydroxyl groups in addition to isocyanate groups are obtained. The reactants are used in such proportions that the reaction mixture contains an at least 200% and preferably at least 800% molar excess of isocyanate groups over the groups which are reactive with isocyanates. The term "groups which are reactive with isocyanate groups" used in this context does not, of course, include those phenolic hydroxyl groups which are meant to be preserved unreacted in the products of the process. The reaction between the polyisocyanates and the phenols with functional groups generally takes between 5 minutes and several hours. The (second) phenolic hydroxyl group only reacts very slowly and incompletely so that the isocyanates obtained are modified with phenolic hydroxyl groups.

The reaction of —NCO groups with the reactive groups other than the phenolic hydroxyl group need not be complete. Also there is no harm if, in the case of aminophenols or carboxyphenols, a certain proportion of the phenolic hydroxyl groups also undergo reaction.

The only essential requirement according to the invention is that the polyisocyanate component should react with the phenolic modifying component to form a proportion of polyisocyanate which is modified with phenolic hydroxyl groups.

An essential precondition for carrying out the process which prepares the polyisocyanate containing a phenolic hydroxyl group is, of course, that the reactants should be sufficiently compatible and miscible with each other. It is therefore advisable to use solvents if solid reactants are used or if the reactants are insufficiently compatible with each other. Any suitable inert solvent for the reactants may be used such as, for example, chlorobenzene, acetone, cyclohexanone, tetrahydrofuran, methylene chloride, tetrachloroethane and dioxane and particularly also, for example, highly concentrated aqueous solutions of urea or caprolactam because these solutions are excellent solvents for a wide variety of phenols. When using such aqueous systems it is, of course, inevitable that a portion of the polyisocyanate will react with water, in particular with formation of polyurea. The reaction products obtained when using such solvents are therefore systems which, in addition to containing isocyanate groups and phenolic hydroxyl groups, contain in particular urea groups. Regardless of the nature of the solvent used, the products of the process do, of course, also contain urethane and/or urea and/or carbonamide groups due to the reaction of isocyanate groups with hydroxyl-, amino- or carboxyl groups.

The products of the process are characterized by an isocyanate content of 3 to 45, preferably 10 to 42 percent by weight, a phenolic hydroxyl group content of 0.01 to 5 and preferably 0.1 to 2 percent by weight and an average isocyanate functionality of 1.8 to 4.0, preferably 2.0 to 3.0.

Particularly preferred products of the process are those which have a viscosity of 10 – 20,000 cP at 25° C such as can be obtained by using the liquid polyisocyanate mixture provided by the invention for the modifying reaction. To prepare such preferred liquid reaction products it is particularly suitable to use phosgenation products of aniline/formaldehyde condensates which have viscosities within the range of 8 cP to 10,000 cP at 25° C. The viscosity of these phosgenation products can be adjusted in known manner by distillation and back mixing of various fractions. Particularly low-viscosity polyisocyanate mixtures of the diphenylmethane series are obtained by enriching the mixtures with 2,4'-diisocyanato-diphenylmethane or 2,2'-diisocyanato-diphenylmethane.

The isocyanate content of the products provided by the invention can be determined by titration with dibutylamine in known manner and, at the same time, correcting the value for the dibutylamine and consumption by the neutralizing reaction which takes place between the phenolic hydroxyl groups and dibutylamine. The proportion of dibutylamine used up by this neutralization reaction can be determined by a parallel test after urethanization of the isocyanate groups with methanol.

To determine the phenolic hydroxyl group content in the products of the process it is advisable to use the known acetic acid anhydride method of determining phenolic hydroxyl groups after urethanization of the isocyanate groups with methanol and removal of the excess methanol under vacuum.

The products obtained by the process according to the invention differ only slightly from the unmodified starting polyisocyanates in their physical and solubility properties and their reactivity. One major advantage, however, is their affinity to polar surfaces, particularly in the presence of basic compounds. Thus, polyisocyanates which have been modified by phenolic hydroxyl groups according to the invention are capable of forming with aqueous systems stable emulsions of the W/O- or O/W-type in the presence of alkaline substances.

The new modified polyisocyanates are particularly suitable for the production of self-hardening emulsions with alkali metal silica solutions. The products of the process are also eminently suitable for producing both foam and non-cellular plastics. The particularly preferred liquid products can easily be applied by the usual techniques such as casting processes and with the aid of the usual conveyor systems and feed systems.

The products are highly compatible with both hydrophobic and hydrophilic reactants and, particularly, with polyethylene oxide polyethers, ionomeric glycols and amine salts of various kinds. One particular advantage of the products is that they readily form salts with alkalis and yet do not inactivate the tertiary amines commonly used as catalysts in foam-formulations. Thus the polyisocyanates according to the invention are suitable, for example, for the production of hydrophilic foams which may be used, for example, as ion exchangers and agricultural foams as well as for domestic sponges, dishcloths and the like.

Any suitable organic compound which contains Zerewittinoff-active hydrogen atoms (component $d$ of the reaction mixture used to make flexible elastomers) may be used. Preferred compounds have a molecular weight of about 400 to about 6000 and contain at least two hydrogen atoms which are contain 2 to 8 hydroxyl groups, especially those with a molecular weight of 400 to 6000, preferably 1000 to 6000, e.g. polyesters, polyethers, polythioethers, polyacetals, polycarbonates and polyester amides containing at least 2, generally 2 to 8 but preferably 2 to 4 hydroxyl groups, of the kind known per se for the production of homogeneous and cellular polyurethanes are especially preferred.

Any suitable polyester with hydroxyl groups may be used for this purpose such as, e.g. reaction products of polyhydric alcohols, preferably dihydric alcohols with the optional addition of trihydric alcohols, and polybasic, preferably dibasic carboxylic acids. Instead of the free polycarboxylic acids, the corresponding polycarboxylic acid anhydrides or corresponding polycarboxylic acid esters of lower alcohols or their mixtures may be used for producing the polyesters. The polycarboxylic acids may be aliphatic, cycloaliphatic, aromatic and/or heterocyclic and may be substituted, e.g. with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and bis-glycol terephthalate. Suitable polyhydric alcohols are e.g. ethylene glycol, propylene-1,2- and -1,3-glycol, butylene-1,4- and -2,3-glycol, hexane-1,6-diol, octane-1,8-diol, neopentyl glycol, cyclohexane dimethanol, (1,4-bis-hydroxymethyl cyclohexane), 2-methyl-propane-1,3-diol, glycerol, trimethylol propane, hexane-1,2,6-triol, butane-1,2,4-triol, trimethylol ethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may contain a proportion of carboxyl end groups. Polyesters of lactones such as ε-caprolactone or hydroxycarboxylic acids, e.g. ω-hydroxy-caproic acid, may also be used.

Any suitable polyether may be used for the process according to the invention, which contains at least two, generally 2 to 8 and preferably 2 or 3 hydroxyl groups prepared e.g. by the polymerization of epoxides such as ethylene oxide, propylene oxide, butylene oxide, tetrahydrofuran, styrene oxide or epichlorohydrin, each with itself, e.g. in the presence of $BF_3$, or by the addition of these epoxides, optionally as mixtures or successively, to starting components which contain reactive hydrogen atoms such as alcohols or amines, e.g. water, ethylene glycol, propylene-1,3-glycol or -1,2-glycol, trimethylolpropane, 4,4'-dihydroxy-diphenylpropane, aniline, ammonia, ethanolamine or ethylene diamine. Sucrose polyethers as described e.g. in German Auslegeschrift Nos. 1,176,358 and 1,064,938 may also be used according to the invention. In many cases it is preferred to use polyethers which contain predominantly primary OH-groups (up to 90 percent by weight, based on all the OH-groups present in the polyether). Polyethers modified with vinyl polymers of the kind which are obtained e.g. by polymerizing styrene or acrylonitrile in the presence of polyethers (U.S. Pat. Specification Nos. 3,383,351; 3,304,273; 3,523,093 and 3,110,695 and German Patent Specification No. 1,152,536) and polybutadienes which contain OH-groups or COOH-groups are also suitable. Also polyethers which contain polyureas or urea-formaldehyde resins in finely divided form are suitable. Usually such modified polyethers are organic dispersions with 10–30% resin dispersed in the polyether.

Further details of the preparation and various compositions of such polyethers is found in copending application for U.S. Pat. Ser. No. 464,099, filed Apr. 25, 1974, and Ser. No. 841,589, filed July 14, 1969.

Among the suitable polythioethers should be mentioned particularly the condensation products of thiodiglycol with itself and/or with other glycols, dicarboxylic acids, formaldehyde, aminocarboxylic acids or amino alcohols. The products obtained are polythio mixed ethers, polythioether esters or polythioether ester amides, depending on the co-components used.

Suitable polyacetals are e.g. the compounds which can be prepared from glycols such as diethylene glycol, triethylene glycol, 4,4'-dioxethoxy-diphenyldimethylmethane, hexanediol and formaldehyde. Polyacetals suitable for the purpose of the invention may also be obtained by the polymerization of cyclic acetals.

The polycarbonates with hydroxyl groups which may be used are also known per se, e.g. those which can be obtained by reacting diols such as propane-1,3-diol, butane-1,4-diol and/or hexane-1,6-diol, diethylene glycol, triethylene glycol or tetraethylene glycol with diaryl carbonates, e.g. diphenyl carbonate or phosgene.

The polyester amides and polyamides which may be used include e.g. the predominantly linear condensates which are obtained from polybasic saturated and unsaturated carboxylic acids or their anhydrides and polyvalent saturated and unsaturated amino alcohols, diamines, polyamines and their mixtures.

Polyhydroxyl compounds which already contain urethane or urea groups and modified or unmodified natural polyols such as castor oil, carbohydrates or starch may also be used. Addition products of alkylene oxides with phenol formaldehyde resins or with urea formaldehyde resins may also be used according to the invention.

To insure the flexible character of the elastomeric products of the process, polyether polyols and polyester polyols with molecular weights of 1000 to 6000 which contain flexible chains and have an average functionality of 2.1 to 3 are preferred.

Representatives of these organic compounds containing reactive hydrogen atoms which are to be used according to the invention have been described e.g. in High Polymers, Volume XVI, "Polyurethanes, Chemistry and Technology", published by Saunders and Frisch, Interscience Publishers, New York/London, Volume I (1962), pages 32 to 42 and pages 44 to 54, and Volume II (1964), pages 5 to 6 and 198 to 199, and in Kunststoff-Handbuch, Volume VII (1966), Vieweg-Höchtlen, Carl-Hanser-Verlag, Munich, e.g. on pages 45 to 71.

The invention contemplates the use of any suitable aqueous solution of an alkali metal silicate, containing 20% – 70% by weight of said alkali metal silicate, such as, for example, sodium silicate, potassium silicate or the like. Such aqueous silicates are normally referred to as "waterglass". It is also possible to use crude commercial-grade solutions which can additionally contain, for example, calcium silicate, magnesium silicate, borates and aluminates. The $Me_2O:SiO_2$ ratio is not critical and can vary within the usual limits, preferably amounting to 4–0.2. Me, of course, refers to the alkali metal. Preferably, sodium silicate with a molar ratio of $Na_2O:SiO_2$ between 1:1.6 and 1:3.3 is used. If the water content of the inorganic-organic end product initially obtained by reaction with the organic polyisocyanate is unimportant because it is chemically bound by the water-binding component as it is harmless or because it can readily be removed by drying, it is possible to use neutral sodium silicate from which 20 to 35% by weight solutions can be prepared. However, it is preferred to use 32% to 54% silicate solutions which, only if made sufficiently alkaline, have a viscosity of less than 500 poises at room temperature which is the limit required to insure problem-free processing. Although ammonium silicate solutions e.g. guanidinium silicate can also be used, they are less preferred. The solutions can either be genuine solutions or even colloidal solutions.

The choice of the concentration of the aqueous silicate solution is governed above all by the required end product. Compact or closed-cell materials are preferably prepared with concentrated silicate solutions which, if necessary, are adjusted to low viscosity by the addition of alkali hydroxide. It is possible in this way to prepare 40% to 70% by weight solutions. On the other hand, 20% to 40% by weight silicate solutions are preferably used for the production of open-cell lightweight foams in order to obtain low viscosities, sufficiently long reaction times and low densities. Even in cases where finely divided inorganic fillers are used in relatively large quantities, 20% to 45% by weight silicate solutions are preferred.

It is also possible to make the silicate solution in situ by using a combination of solid alkali metal silicate and water.

Water-binding components used according to the invention include organic or inorganic water-binding substances which have first the ability to chemically combine, preferably irreversibly, with water and second the ability to reinforce the organic-inorganic end products of the invention. The most preferred water-binding agents of the invention, hold the water chemically bound until heated sufficiently, as in a fire. Thus, in a fire the water is released and extinguishes the fire. The term "water-binding component" is used herein to identify a material preferably granular or particulate which is sufficiently anhydrous to be capable of absorbing water to form a solid or gel such as mortar or hydraulic cement. This component may be a mineral or chemical compound which is anhydrous, such as CaO and $CaSO_4$ but may exist as a partial hydrate. The water-binding components preferably used are inorganic materials such as hydraulic cements, synthetic anhydrite, gypsum or burnt lime.

Suitable hydraulic cements are in particular Portland cement, quick-setting cement, blast-furnace Portland cement, mild-burnt cement, sulphate-resistant cement, brick cement, natural cement, lime cement, gypsum cement, pozzolan cement and calcium sulphate cement. In general, any mixture of fine ground lime, alumina and silica that will set to a hard product by admixture of water, which combines chemically with the other ingredients to form a hydrate may be used. The most preferred forms of water-binding agents to be used in accordance with the invention are those materials which are normally known as cement. In other words, they are a normally powdered material with which water normally forms a paste which hardens slowly and may be used to bind intermixed crushed rock or gravel and sand into rock-hard concrete. There are so many different kinds of cement which can be used in the production of the compositions of the invention and they are so well known that a detailed description of cement will not be given here. However, one can find such a detailed description in *Encyclopedia of Chemical Technology*, Volume 4, Second Edition, Published by Kirk-Othmer, pages 684–710, as well as in other well known references in this field. In particular, pages 685–697 of the aforementioned Volume 4, Second Edition of Kirk-Othmer's Encyclopedia containing a detailed description of the type of cement which may be used in the production of the compositions of this invention are incorporated herein by reference.

Production of the inorganic-organic compositions according to the invention is simple. It is merely necessary for the components to come together, for example, one may mix the organic polyisocyanate with the aqueous alkali silicate solution, and sufficient of the water-binding component unless the organic polyisocyanate also contains ionic groups, after which the mixture generally hardens immediately. The mixtures are typical finely divided emulsions or sols. They are not optically clear, but generally opaque or milky-white. The subsequent xerosol seems to be preformed in them.

Preparation of the organic-inorganic flexible elastomers according to the invention is in the simplest case carried out by mixing the three components a), b) and d) (one-shot process) to form an emulsion whose degree of subdivision as well as chemical constitution depends in particular on the nature and number of the hydrophilic groups contained in it and on the amount of energy expended for mixing the components (in particular in the case of products which are not hydrophilically modified). As already mentioned above, however, the reaction product of a) and d) may be mixed with component b) (prepolymer process). In fact, any method of mixing may be employed, for example a) and d) may be mixed and then added to b) either before, during or immediately after the reaction. The mixing process results primarily in the formation of a finely divided stable emulsion in which the organic component is the external phase. The emulsion subsequently hardens to form the elastomer. Due to the alkaline silicate phase which has a strong catalytic action hardening in most cases takes place spontaneously at 0° to 20° C with the evolution of heat. Hardening is then substantially completed within 1 to 5 minutes. In the case of less reactive isocyanates and especially when using masked isocyanates, among which are also included the amine-amides, hardening may take a longer time and require higher temperatures. Due to the spontaneous evolution of heat and rapid hardening, the process according to the invention is particularly suitable for producing flexible foams of various kinds. Important advantages obtained according to the invention are the short mixing time, which may be instantaneous or may amount to between 15 seconds and at the most about 5 minutes when the components are mixed by a discontinuous process, and the rapid hardening time, which is generally less than 30 minutes.

In commercial production processes, these advantages can result in short molding times and hence rapid manufacturing cycles.

The mixture of the components, generally is not stable. The so-called "pot lives", during which the mixtures are processible, are governed above all by the amount and reactivity of the organic polyisocyanate and by the concentration of the silicate solution. The "pot life" is between 0.2 seconds and 2 days, it can be adjusted between 0.2 seconds and several hours (i.e., about 4 hours) or it can be between 2 seconds to about 1 hour. In the case of masked isocyanates which do not contain free —NCO groups, it is even possible to achieve pot lives of several hours up to about 2 days. Pot lives of from about 1 second to about 20 minutes are preferred at these times are most often suitable.

It follows from this that combination of the reactive starting materials is generally carried out immediately before forming. The polyurea-silica gel composite materials can be produced by previously known techniques, for example, in the same way as cast or foamed polyurethanes employing for example, a mixer such as is disclosed in U.S. Pat. No. Re. 24,514. If the water-binding component is also included in the reaction mixture it is preferred to use a mixer such as is conventionally used in the building-construction trade, for example, for making mortar. Thus, a mixer with a large ribbon type blender can be used whereby the three components are simultaneously introduced into the mixer and then shortly after mixing the reacting components are poured onto a surface or into a mold where they are allowed to react to form the inorganic-organic compositions of the invention. Still further it is possible to simply mix the components in a container for example with a relatively low speed mixer as one would use to stir paint and then pour the components into another mold or to allow them to react in the container. It is also possible to use a kneader for the mixing of the components. Still further, one may mix the reacting components in an extruder which has one or more entrance ports so that components may be either simultaneously injected and mixed or they may be separately added to the extruder. For example, a premixture of the alkali metal silicate solution and the organic polyisocyanate may be mixed with the water-binding component or alternately it is possible to insert the three components one at a time into the extruder through separate ports and it is even possible to add an accelerator through a fourth port into the extruder.

It is important, if the water-binding component is present in the reaction mixture, that it be kept separate from the alkali metal silicate solution until it is time to allow the reaction mixture to react to completion. Thus, it is possible to mix the three essential components of this invention; namely, the organic polyisocyanate, the alkali silicate solution, and the water-binding component simultaneously or it is also possible to premix the water-binding component and the organic polyisocyanate component and then add the alkali metal silicate component. It is generally undesirable to mix the water-binding component and the alkali metal silicate component before the organic polyisocyanate is added because this can lead to preliminary solidification of the alkali metal silicate solution. Thus, it is preferred to either simultaneously mix all three of the essential components or first mix the organic polyisocyanate with either the alkali metal silicate solution or the water-binding component and then add the remaining ingredient to the mixture. Especially when isocyanates without ionic groups are used, the water-binding component at least in a considerable amount must be dispersed in the organic phase.

Furthermore in this case the amount of isocyanate should be at least 10% by weight, based on the total weight of a), b) and c).

The quantitative ratios of the components is not critical in the production of the polyurea silica gel composite material except that where low amounts of water-binding components below 20% by weight are present the isocyanate must contain ionic groups. This is of particular advantage because it means that dosage does not have to be exact even in continuous production through metering devices and mixing chambers. Thus, it is even possible to use heavy-duty metering devices such as gear pumps.

The ratios of the essential reactants which lead to the inorganic-organic compositions of the invention may vary, broadly speaking within ranges as follows:

(a) from 5-98% by weight of the organic polyisocyanate (preferably containing ionic groups)
(b) from 2-95% by weight of an aqueous alkali metal silicate solution containing about 20-70% by weight of said alkali metal silicate and
(c) from 0-93% by weight of a water-binding component, based on the total weight of a), b) and c). When the water-binding component is present in amounts below about 20% by weight, it is necessary that the organic polyisocyanate contain 2-200 milliequivalents of ionic groups per 100 grams of said organic polyisocyanate as has been explained above. However, even for the higher amounts of the water-binding component it is preferred that the organic polyisocyanate also contain ionic groups as the combination of organic polyisocyanates with ionic groups and the water-binding component particularly the hydraulic cements or synthetic anhydrite, gypsum and burnt lime leads to the best results.

Thus, a preferred combination within the scope of the invention involves the reaction of components in the amounts within the following ranges:

(a) 10-80% by weight of said organic polyisocyanate
(b) 20-80% by weight of said aqueous alkali metal silicate solution, and
(c) 10-70% by weight of said water-binding component.

A still more preferred composition is obtained from components in the following ranges:

(a) 10-50% by weight of said organic polyisocyanate,
(b) 20-70% by weight of said alkali metal silicate solution, and
(c) 20-70% by weight of said water-binding component.

The most preferred ranges of components are as follows:

(a) 10-35% by weight of said organic polyisocyanate,
(b) 30-60% by weight of said alkali metal silicate solution, and
(c) 30-60% by weight of said water-binding component.

The reactants are preferably mixed at room temperature though any suitable temperature in the range of $-20°$ C to $80°$ C may be employed.

As stated above, it is strongly preferred to always have at least some ionic groups present in the organic polyisocyanate component. When this is so, the activity of the reaction mixture can be most easily adjusted by adjusting the ionic group content. In the case of polyisocyanates containing sulphonic acid groups or carboxylic acid groups, activity is mainly adjusted by varying the chemical nature and amount of the neutralization agent. Thus, if a low activity is desired, one may either not use any neutralizing agent and let the alkali metal silicate solution act as a neutralizer or one may use an inorganic solid neutralizing agent such as for example, calcium carbonate. Alternately, if one wishes to increase the activity so as to make the reaction extremely fast, one may choose a tertiary amine with the highest of basicity. If slightly less than an extremely fast reaction is desired, one may choose an amine of lower basicity or one may vary the amount of the neutralizer, i.e. the more the acid groups that are neutralized the faster is the reaction.

Products of low silicate content, for example, between 10 and 30% by weight are prepared when it is desired that the organic polymer properties should be predominant. In these products the silicate fraction reacts as a binding substance with the normally inactive fillers such as chalk, heavy spar, gypsum, anhydrite, clay, kaolin and the like.

Small quantities of silicate solutions can also be used in cases where it is required to harden an isocyanate prepolymer with water to form a pore-free homogeneous plastic provided said prepolymer contains ionic groups, if there is insufficient water-binding component present. Since the reaction of NCO-groups with water is known to be accompanied by the evolution of $CO_2$, in the absence of alkali metal silicate water can virtually only be used for the production of foams. In the presence of alkali metal silicate, the $CO_2$ formed is absorbed by the silicate. Thus, even in cases where waterglass solutions are used in standard polyurethane elastomer recipes, it is possible to prevent the formation of pores through liberated $CO_2$. Further, the reaction of organic polyisocyanate containing ionic groups with concentrated alkali metal silicate solutions, which may if desired be alkalized, leads to a product with considerably reduced pore formation and, providing the quantitative ratios which can be empirically determined without difficulty are adapted to one another, to a "water-extended" or water-crosslinked", completely bubble-free material. Accordingly, high quality homogeneous polyureas can be obtained by a simple, solvent-free direct process. The required reaction velocity can readily be adjusted by varying the ionic group content. In the simplest case, this is done, for example, by sulphonation, if desired, followed by neutralization of the prepolymer.

According to the invention, foam materials with excellent fire resistance is obtained if the sum of inorganic constituents is more than 30% by weight but preferably more than 50% by weight, based on the total mixture.

High silicate contents, for example from 50% to 95% by weight, are desirable in cases where the properties of an inorganic silicate material, especially high-temperature stability and relatively complete non-inflammability, are essential requirements. In this case, the function of the organic polyisocyanate is that of a non-volatile hardener whose reaction product is a high molecular weight polymer which reduces the brittleness of the product. By virtue of the elasticizing effect, organic polyisocyanates are superior to the conventional acid-based hardeners. The hardening times generally increase with decreasing ionic group content. However, it is of course, also possible to use organic polyisocyanates, in combination with acid-liberating hardeners. In this case, the reaction products of the organic polyisocyanates with water act mainly as elasticizing component. When using polyisocyanates without ionic groups but containing water-binding components the amount of aqueous silicate solution must not exceed 70% by weight.

Mixtures of organic polyisocyanates and aqueous silicate solutions containing more than 30% by weight of water are preferably used for the production of thin layers, for example, surface coatings or putties, adhesives, caulks and more particularly, for the production of foams.

In the production of foams by the process according to the invention, it is also advisable to use expanding or blowing agents. Any suitable blowing agent may be used including, for example, inert liquids boiling at temperatures of from −25° to +50° C. The blowing agents preferably have boiling points of from −15° C to +40° C. The blowing agents are preferably insoluble in the silicate solution. Particularly suitable blowing agents are alkanes, alkenes, halogen-substituted alkanes and alkenes or dialkyl ethers, such as for example saturated or unsaturated hydrocarbons with 4 to 5 carbon atoms such as isobutylene, butadiene, isoprene, butane, pentane, petroleum ether, halogenated saturated or unsaturated hydrocarbons such as chloromethyl, methylene chloride, fluorotrichloromethane, difluorodichloromethane, trifluorochloromethane, chloroethane, vinyl chloride, vinylidene chloride. Trichlorofluoromethane, vinyl chloride and $C_4$-hydrocarbons such as butane for example, have proved to be the most suitable.

Thus, any suitable highly volatile inorganic and/or organic substances may be used as a blowing agent, including those listed above. Additional suitable blowing agents are, for example, acetone, ethyl acetate, methanol, ethanol, hexane or diethylether. Foaming can also be achieved by adding compounds which decompose at temperatures above room temperature to liberate gases such as nitrogen for example, azo compounds, such as azoisobutyric acid nitrile. Other examples of blowing agents are included for example in Kunststoff-Hanbuch, Volume VII, published by Vieweg and Höchtlen, Carl-Hanser-Verlag, Munich, 1966, e.g. on pages 108 and 109, 453 to 455 and 507 to 510; but the water contained in the mixture may also function as blowing agent. Fine metal powders such as powdered calcium, magnesium, aluminum or zinc may also be used as blowing agents since they evolve hydrogen in the presence of waterglass which is sufficiently alkaline and, at the same time, have a hardening and reinforcing effect.

It has been found that blowing agents which contain fluorine such as those listed above exhibit a synergistic effect in that they not only function to foam the reaction mixture but also they have a special effect in that they decrease the surface tension of the organic phase. This is important because it makes it possible to obtain high quality products even with relatively small amounts of polyisocyanates. Furthermore, the use of a fluorine, containing blowing agent, such as the chloro fluoro alkanes listed above assists in creating a greater differential between the surface tension of the inorganic phase which is higher and the surface tension of the organic phase.

Thus, the best products of the invention are believed to be the ones where the organic phase is the continuous phase and the inorganic phase is a discontinuous or continuous phase and this may be brought about by the use of an amount of an organic polyisocyanate which is more than 20% by weight of the portion of the composition based on the organic polyisocyanate, the alkali metal silicate and the water-binding component, but it can be even less than 20% by weight where one employs a fluorine containing blowing agent because of the lower surface tension of the organic phase which leads to the results pointed out above. In other words, it is possible to get a continuous organic phase with lower amounts of organic polyisocyanate when one uses a fluorine containing blowing agent.

The blowing agents may be used in quantities of from up to 50% by weight and preferably in quantities of from 2% to 10% by weight, based on the reaction mixture.

Foams can, of course, also be produced with the assistance of inert gases, especially air. For example, one of the two reaction components can be performed with air and then mixed with the other. The components can also be mixed for example, by means of compressed air so that foam is directly formed, subsequently hardening in molds.

Other substances, such as the emulsifiers, activators and foam stabilizers normally used in the production of polyurethane foams, can also be added. However, they are generally not necessary. An addition of silanes, polysiloxanes, polyether polysiloxanes or silyl-modified isocyanates, can intensify the interaction between the two phases. Examples of foam stabilizers are disclosed in U.S. Pat. No. 3,201,372 at Column 3, line 46 to Column 4, line 5.

Catalysts are often used in the process according to the invention. The catalysts used may be known per se, e.g. tertiary amines such as triethylamine, tributylamine, N-methylmorpholine, N-ethyl-morpholine, N-cocomorpholine, N,N,N',N'-tetramethyl-ethylenediamine, 1,4-diaza-bicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylenetriamine, N,N-dimethyl cyclohexalamine, N,N,N',N'-tetramethyl-1,3-butanediamine, N,N-dimethyl-β-phenyl ethyl-amine, 1,2-dimethyl imidazole, 2-methyl imidazole and particularly also hexahydrotriazine derivatives.

The following are examples of tertiary amines containing hydrogen atoms which are reactive with isocyanate groups: triethanolamine, triisopropanolamine, N-methyl-diethanolamine, N-ethyl-diethanolamine, N,N-dimethyl-ethanolamine and their reaction products with alkylene oxides such as propylene oxide and/or ethylene oxide.

Silaamines with carbon-silicon bonds may also be used as catalysts, e.g. those described in German Patent Specification No. 1,229,290, for example 2,2,4-trimethyl-2-silamorpholine or 1,3-diethylaminomethyl-tetramethyldisiloxane.

Bases which contain nitrogen such as tetraalkyl ammonium hydroxides alkali metal hydroxides such as sodium hydroxide, alkali metal phenolates such as sodium phenolate or alkali metal alcoholates such as sodium methylate may also be used as catalysts. Hexahydrotriazines are also suitable catalysts.

Organic metal compounds may also be used as catalysts according to the invention, especially organic tin compounds.

The organic tin compounds used are preferably tin (II) salts of carboxylic acids such as tin (II)-acetate, tin (II)-octoate, tin (II)-ethyl hexoate and tin (II)-laurate and the dialkyl tin salts of carboxylic acids such as dibutyl tin diacetate, dibutyl tin dilaurate, dibutyl tin maleate or dioctyl tin diacetate.

Other examples of catalysts which may be used according to the invention and details of the action of the catalysts may be found in Kunststoff-Handbuch, Volume VII, published by Vieweg and Höchtlen, Carl-Hanser-Verlag, Munich, 1966, e.g. on pages 96 to 102.

The catalysts are generally used in a quantity of between about 0.001 and 10% by weight, based on the quantity of isocyanate when the reaction mixture does not contain an organic compound having reactive hydrogen atoms.

When making flexible products, the catalysts may be used in any catalytic amount, preferably in an amount of about 0.001–10 percent by weight, based on the quantity of organic compounds with a molecular weight of 400 to 6000 which contain at least two hydrogen atoms capable of reacting with isocyanates.

Surface-active additives (emulsifiers and foam stabilizers may also be used according to the invention in making flexible elastomers. Suitable emulsifiers are e.g. the sodium salts of ricinoleic sulphonates or of fatty acids or salts of fatty acids with amines such as oleic acid diethylamine or stearic acid diethanolamine. Alkali metal or ammonium salts of sulphonic acids such as dodecyl benzene sulphonic acid or dinaphthyl methane disulphonic acid, or of fatty acids such as ricinoleic acid or of polymeric fatty acids may also be used as surface-active additives.

The foam stabilizers used are mainly water-soluble polyether siloxanes. The compounds generally have polydimethyl siloxane group attached to a copolymer of ethylene oxide and propylene oxide. Foam stabilizers of this kind have been described e.g. in U.S. Pat. No. 3,629,308.

According to the invention, reaction retarders, e.g. substances which are acid in reaction such as hydrochloric acid or organic acid halides, cell regulators known per se such as paraffins or fatty alcohols or dimethyl polysiloxanes, pigment dyes, flame-retarding agents known per se stabilizers against ageing and weathering, plasticizers and fungistatic anti-bacteriostatic substances and fillers such as barium sulphate, kieselguhr, carbon black or whiting may also be used.

Other examples of surface-active additives, foam stabilizers, cell regulators, reaction retarders, stabilizers, flame-retarding substances, plasticizers, dyes and fillers and fungistatic and bacteriostatic substances which may also be used according to the invention and details concerning their use and mode of action are described in Kunststoff-Handbuch, Volume VII, (1966), Vieweg and Höchtlen, Carl-Hanser-Verlag, Munich, e.g. on pages 103 to 113.

Particularly high quality products are obtained by the process according to the invelntion where hardening is carried out at temperatures above 80° C, more particularly at temperatures of from 100° C to 200° C. Particularly in the case of combinations of organic polyisocyanates with 10% to 40% of NCO-groups and alkali silicate solutions, so much heat is liberated, even in the absence of applied heat, that the water present begins to evaporate. Temperatures up to 130° C are reached inside the foam blocks. The foregoing temperatures are only the preferred ones in the absence of water-binding components. If water binding components are present then the temperatures are usually lower, in most cases, for instance, between about 40° and about 100° C.

It would seem that particularly pronounced interactions and a particularly intimate bond between inorganic and organic polymer are developed under conditions such as these, resulting in the formation of materials which, on the one hand, are as hard as stone but which on the other hand are highly elastic and, hence, highly resistant to impact and breakage.

If the quantity of heat which is liberated during the reaction between the components is not sufficient to obtain optimum properties, mixing can readily be carried out at elevated temperature, for example at temperatures of from 40° C to 100° C. In special cases, mixing can also be carried out under pressure at temperatures above 100° C up to about 150° C in a closed container so that expansion occurs, accompanied by foam formation, as the material issues from the container.

Generally, production of the foams in accordance with the invention is carried out by mixing the described reaction components together either in one stage or in several stages in a baton-type or continuous mixer, and allowing the resulting mixture to foam and harden in molds or on suitable substrates, generally outside the mixer. The necessary reaction temperature amounting to between preferably about 0° C and 200° C and most preferably to between 40° C and 130° C, can either be achieved by preheating one or more reaction components before the mixing process or by heating the mixer itself or by heating the reaction mixture prepared after mixing. Combinations of these or other procedures for adjusting the reaction temperature are of course, also suitable. In most cases, sufficient heat is generated during the reaction itself so that, after the beginning of the reaction of foaming, the reaction temperature can rise to levels above 100° C.

For any given recipe, the properties of the resulting foams, for example, their moist density, is governed to some extent by the parameters of the mixing process, for example, the shape and rotational speed of the stirrer, the shape of the mixing chamber etc., and also by the reaction temperature selected for initiating foaming. The moist, fresh foam can have a density of approximately from 0.02 to 1.3 g/cc, although in general the moist fresh foam is obtained with densities of from 0.1 to 0.8 g/cc. The dried foams can have closed or open cells, although in most cases they are largely made up of open cells and have densities of from 0.02 to 1.1 g/cc. Where the water-binding component is present, densities of 0.1 to 0.8 g/cc are preferred.

The foam material may have closed or open cells but is in most cases substantially open-celled and has a compression strength of between 5 and 150 kg/cm$^2$ when its density is between 0.1 and 0.8 g/cc.

The compression strength obtained according to the invention depend to a large extent on the proportions in which the starting components are mixed and on the resulting density, e.g. densities of between 200 and 600 kg/m$^3$ and compression strengths of 10 to 100 kg.wt/cm$^2$ are obtained when using a mixture of about equal parts of polyisocyanate, alkali metal silicate and water-binding filler if at the same time about 5% by weight (based in the total quantity) of a low-boiling blowing agent is used.

By virtue of the behavior of the reaction mixtures, the process according to the invention is provided with a number of potential utilities either as porous or homogeneous materials, and, accordingly, a few fields of application are outlined by way of example in the following. The possibility of leaving the water present in the hardened mixtures either as a required constituent of the foam, or of protecting the foam against the elimination of water by suitably coating or covering the foam with a water impermeable layer, or by removing all or some of the water by suitable drying techniques, for example, in a heating cabinet, or even hot air, infrared heating, ultra-sonic heating or high-frequency heating, can be selected from case to case to suit the particular requirements of application.

The reaction mixture containing the blowing agent can be coated for example, onto any given warm, cold or even IR- or HF-irradiated substrates, or after passing through the mixer, can be sprayed with compressed air or even by the airless process onto these substrates on which it can foam and harden to give a filling or insulating coating. The foaming reaction mixture can also be molded, cast or injection-molded in cold or heated molds and allowed to harden in these molds, whether relief or solid or hollow holds, if desired by centrifugal casting at room temperature or temperatures of up to 200° C and if desired under pressure. In this respect, it is quite possible to use strengthening elements, whether in the form of inorganic and/or organic or metallic wires, fibers, webs, foams, woven fabrics, skeletons, etc. This can be done for example by the fiber-mat impregnating process or by processes in which reaction mixtures and strengthening fibers are applied together to the mold, for example, by means of a spray unit. The moldings obtainable in this way can be used as structural elements, for example, in the form of optionally foamed sandwich elements produced either directly or subsequently by lamination with metal, glass, plastic, etc., in which case the favorable flame behavior of the foams in their moist or dry form is of particular advantage. However, they can also be used as hollow bodies, for example, as containers for products that may have to be kept moist or cool, as filter materials or exchangers, as supports for catalysts or active substances, as decorative elements, as parts of furniture and as cavity fillings. They can also be used as high-stress lubricants and coolants or as carriers therefor, for example, in the extrusion of metals. They can also be used in the field of pattern and mold design, and also in the production of molds for casting metals.

In one preferred procedure, foaming is directly accompanied by hardening, for example by preparing the reaction mixture in a mixing chamber and simultaneously adding the readily volatile blowing agent, for example dichlorodifluoromethane, trichlorofluoromethane, butane, isobutylene or vinyl chloride, so that, providing it has a suitable temperature, the reaction mixture issuing from the mixing chamber simultaneously foams through evaporation of the blowing agent and hardens to its final foam form under the effect of the organic polyisocyanate, said foam optionally containing emulsifiers, foam stabilizers and other additives. In addition, the initially still thinly liquid reaction mixture can be expanded into a foam by the introduction of gases optionally under pressure such as air, methane, CF$_4$, noble gases, the resulting foam being introduced into the required mold and hardened therein. Similarly, the silicate- or organic polyisocyanate solution optionally containing foam stabilizers such as surfactants, foam formers, emulsifiers and, optionally, other organic or inorganic fillers or diluents, may initially be converted by blowing gas into a foam and the resulting foam subsequently mixed in the mixer with the other components and optionally with the hardener and the resulting mixture allowed to harden.

In one preferred procedure, a solution of the organic polyisocyanate in liquid expanding or blowing agent is mixed with the optionally preheated aqueous alkali silicate solution and thus hardened while foaming.

Instead of blowing agents, it is also possible to use inorganic or organic finely divided hollow bodies such as expanded hollow beads of glass or plastics, straw and the like, for producing foams.

The foams obtainable in this way can be used either in their dry or moist form, if desired after a compacting or tempering process, optionally carried out under pressure, as insulating materials, cavity fillings, packaging materials, building materials with outstanding resistance to solvents and favorable flame behavior. They can also be used as lightweight bricks or in the form of sandwich elements, for example, with metal covering layers, in house, vehicle and aircraft construction.

The reaction mixtures can also be dispersed in the form of droplets, for example, in petrol, or foamed and hardened during a free fall or the like, resulting in the formation of foam beads.

It is also possible to introduce into the foaming reaction mixtures, providing they are still free-flowing, organic and/or inorganic foamable or already foamed particles, for example expanded clay, expanded glass, wood, popcorn, cork, hollow beads of plastics, for example, vinyl chloride polymers, polyethylene, styrene polymers or foam particles thereof or even, for example, polysulphone, polyepoxide, polyurethane, ureaformaldehyde, phenol formaldehyde, polyimide polymers, or to allow the reaction mixtures to foam through interstitial spaced in packed volumes of these particles, and in this way to produce insulating materials which are distinguished by favorable flame behavior.

When a mixture of aqueous silicate solutions optionally containing inorganic and/or organic additives and the organic polyisocyanates has simultaneously added to it at a predetermined temperature the blowing agent which is capable of evaporation or of gas formation at these temperatures, for example a (halogenated) hydrocarbon, the initially liquid mixture formed can be used not only for producing uniform foams or non-uniform foams containing foamed or unfoamed fillers, it can also be used to foam through any given webs, woven fabrics, lattices, structural elements or other permeable structures of foamed materials, resulting in the formation of composite foams with special properties, for example, favorable flame behavior, which may optionally be directly used as structural elements in the building, furniture or vehicle and aircraft industries.

The foams according to the invention can be added to soil in the form of crumbs, optionally in admixture with fertilizers and plant-protection agents, in order to improve its agrarian consistency. Foams of high water content can be used as substrates for propagating seedlings, cuttings and plants or cut flowers. By spraying the mixtures onto impassable or loose terrain, for example, sand dunes or marshes, it is possible to obtain effective consolidation which soon becomes passable and offers protection against errosion.

It is also advantageous to spray the proposed reaction mixtures onto an article to be protected in the event of fire or accident, the water present being unable to run down or prematurely evaporate on the surface of the structure to be protected, so that particularly effective protection against fire, heat or radiation is obtained because the hardened mixture, providing it still contains water, cannot be heated to temperatures appreciably above 100° C and it also absorbs IR or nuclear radiation.

By virtue of their favorable spray properties, the mixtures can form effective protective walls and protective layers in the event of mining accidents and also in routine work, for example, by spraying them onto woven fabrics, other surfaces, lattices or even only onto walls. One particular advantage in this respect is that hardening is quickly obtained.

Similarly, the foaming mixtures can be used in construction engineering, in civil engineering and road building for erecting walls, igloos, seals, for filling joints, plastering, flooring, insulation, decoration and as a coating, screed and covering material. They can also be considered for use as adhesives or mortars or as casting compositions, optionally filled with inorganic or organic fillers.

Since the hardened foams obtained by the process according to the invention can show considerable porosity after drying, they are suitable for use as drying agents because they can absorb water. However, they can also be charged with active substances or used as catalyst supports or filters and absorbents.

Auxiliaries which may if desired be used in or subsequently introduced into the reaction mixture, such as emulsifiers, surfactants, dispersants, odorants, hydrophobizing substances, enable the property spectrum of the foams in their moist or dry form to be modified as required.

On the other hand, the foams can be subsequently lacquered, metallized, coated, laminated, galvanized, subjected to vapor deposition, bonded or blocked in their moist or dry form or in impregnated form. The moldings can be further processed in their moist or dried form, for example by sawing, milling, drilling, planing, polishing and other machining techniques.

The optionally filled moldings can be further modified in their properties by thermal aftertreatment, oxidation processes, hot-pressing, sintering processes or surface melting or other consolidation processes.

Suitable mold materials include inorganic and/or organic foamed or unfoamed materials such as metals, for example, iron, nickel, fine steel, lacquered or, for example, teflon-coated aluminum, porcelain, glass, wood, plastics such as PVC, polyethylene, epoxide resins, ABS, polycarbonate etc.

The foams obtainable in accordance with the invention can be surface-treated or, where they are in the form of substantially permeable structures, for example substantially open-cell foams or porous materials, can even be treated by centrifuging, vacuum treatment, blowing air through or by rinsing with (optionally heated) liquids or gases which remove the water present, such as methanol, ethanol, acetone, dioxan, benzene, chloroform and the like, or dried with air, $CO_2$, or super heated steam. Similarly, the moist or dry moldings can also be aftertreated by rinsing or impregnating with aqueous or non-aqueous acid, neutral or basic liquids or gases, for example, hydrochloric acid, phosphoric acid, formic acid, acetic acid, ammonia, amines organic or inorganic salt solutions, lacquer solutions, solutions of polymerizable or already polymerized monomers, dye solutions, galvanizing baths, solutions of catalysts or catalyst preliminary stages, odorants and the like.

The new composite materials are particularly suitable for use as structural materials because they show tensile and compressive strength, are tough, rigid and at the same time elastic, show high permanent dimensional stability when hot and are substantially non-inflammable.

Thus, it is possible, for example, to produce high quality lightweight structural panels either by continuously cutting or sawing foamed blocks into corresponding panels or by foaming panels of this kind and, in particular, complicated moldings in molds, optionally under pressure. It is also possible by adopting a suitable procedure to produce molding with an impervious outer skin.

When a technique of foaming in a mold under pressure is employed, molded parts with dense marginal zones and completely non-porous smooth surfaces can be obtained.

However, the process according to the invention is particularly suitable for in situ foaming on the building site. Thus, any types of hollow mold, of the kind made by formwork in the usual way, can be cast or filled with foam.

The reaction mixture can also be used to fill cavities, gaps, cracks, giving a very firm bond between the joined materials. Insulating internal plasters can also be readily produced by spraying on the reaction mixture.

In many cases, the materials obtained can be used instead of wood or hard-fiber boards. They can be sawed, rubbed down, planed, nailed, drilled, milled and in this way, can be worked and used in a number of different ways.

Very brittle lightweight foams of the kind which can be obtained for example by having a very high silicate content or by combination with equally brittle organic polymers, can readily be converted by crushing in suitable machines into dust-fine powders which can be used for a number of different purposes as organically-modified silica fillers. Organic-modification provides effective surface interaction with polymers and, in some cases, also a certain degree of surface thermoplasticity which makes it possible to produce high quality molding compositions on which topochemical surface reactions can be carried out by the addition of crosslinking agents.

Fillers in the form of particulate or powdered materials can be additionally incorporated into the mixtures of organic polyisocyanates and alkali silicates for a number of applications.

Suitable fillers include solid inorganic or organic substances, for example, in the form of powders, granulate, wire, fibers, dumb bells, crystallites, spirals, rods, beads, hollow beads, foam particles, webs, pieces of woven fabric, knit fabrics, ribbons, pieces of film etc., for example, of dolomite, chalk, alumina, asbestos, basic silicas, sand talcum, iron oxide, aluminum oxide and oxide hydrate, zeolites, calcium silicates, basalt wool or powder, glass fibers, C-fibers, graphite, carbon black, Al-, Fe-, Cu-, Ag-powder, molybdenum sulphite, steel wool, bronze or copper cloth, silicon powder, expanded clay particles, hollow glass beads, glass powder, lava and pumice particles, wood chips, sawdust, cork, cotton, straw, jute, sisal, hemp, flax, rayon, popcorn, coke, particles of filled or unfilled, foamed or unfoamed, stretched or unstretched organic polymers including plastics and rubber waste. Of the number of suitable organic polymers, the following, which can be present for example, in the form of powders, granulate, foam particles, beads, hollow beads, foamable or unfoamed particles, fibers, ribbons, woven fabrics, webs etc., are mentioned purely by way of example- polystyrene, polyethylene, polypropylene, polyacrylonitrile, polybutadiene, polyisoprene, polytetrafluoroethylene, aliphatic and aromatic polyesters, melamine-urea or phenol resins, polyacetal resins, polyepoxides, polyhydantoins, polyureas, polyethers, polyurethanes, polyimides, polyamides, polysulphones, polycarbonates, and of course any copolymers as well. Inorganic fillers such as quartz powder, chalk, dolomite are preferred.

Generally, the composite materials according to the invention can be filled with considerable quantities of fillers without losing their valuable property spectrum. The amount of fillers can exceed the amount of the components a), b) and c). In special cases the inorganic-organic composition of the present invention acts as a binder for such fillers.

In cases where higher amounts of fillers are used it may be advisable to add water in order to obtain sufficient working properties, coarse fillers can be used in wet form, powdered fillers such as e.g. chalk, alumina, dolomite, calcium hydroxide, magnesium carbonate, calciumcarbonate can be used also as an aqueous suspension.

Products of low silicate content are particularly suitable for the production of quick-hardening high quality surface coatings which show outstanding adhesion and resistance to abrasion, and for the production of elastomers of high strength and high modulus.

For applications such as these, it is preferred to use isocyanato-prepolymer ionomers of low isocyanate content, for example, less than 5% or even prepolymers which have masked isocyanate groups. It is possible in this way to obtain mixtures with a long pot life which can also be applied in the form of thin layers gradually hardening with time.

If only a small amount of $CO_2$ is liberated (by correct adjustment of proportions and activity) a pasty or doughy plastic material which can be formed in any way is obtained with partial hardening, which is accompanied by an increase in viscosity. This material can be formed and hardened at a later stage, for example, by drying in air or by heating.

Such a two-stage or multi-stage hardening process is of particular interest so far as processing as a putty, trowelling composition, gap-filling compound, mortar and the like, is concerned. In the first stage of this hardening process, for example, there is a rapid evolution of $CO_2$ (for example by the reaction of NCO-groups with water) which converts the inorganic organic composite material into a plastic or thermoplastic processible form, hardening taking place in a second, slower hardening stage, for example through the hydrolysis of a high molecular weight or low molecular weight ester.

The thermoplastic intermediate stage can also be processed by injection molding, extrusion or kneading.

In many cases, these intermediate stages can also be mixed with water, organic solvents, plasticizers, extending agents, fillers, and thus modified and applied in a number of different ways.

The materials according to the invention are also suitable for use as impregnating agents for finishing fibers, for which purpose it is possible both to use completed mixtures of the organic and of the silicate component, and to apply a two-bath treatment. Accordingly, the component with the better adhesion, i.e., the prepolymer component, is preferably initially applied to organic material, and the silicate component to inorganic material.

In addition, it is possible, for example by extruding the mixtures through dies or slots, to produce fibers and films which can be used for example, for the production of synthetic non-inflammable paper or for the production of webs.

The foam material according to the invention is capable either of absorbing water and/or water vapor or of affording considerable resistance to the diffusion of water and/or water vapor, depending on the composition and structure of the material.

The foam material according to the invention opens up new possibilities in the fields of underground and surface engineering and in the production of finished parts and elements.

The following are mentioned as examples of the possibilities of application: the manufacture of wall elements for prefabricated buildings, sand molds, roller shutter casings, window-sills, railroad and underground sleepers, curbstones, stairs, the filling of joints by foaming and the backfilling of ceramic tiles by foaming.

The foam material may also advantageously be used for binding gravel and marble chips, etc.; decorative panels can be obtained in this way which can be used, for example, as facades.

Preparation of the flexible elastomers according to the invention is carried out by techniques which are basically already known, especially those used for producing cast or foamed polyurethanes. The process may be carried out discontinuously or continuously. Preferably, the components are continuously mixed in a mixing chamber with a short residence time by the technique conventionally used for producing polyurethane foams, and the mixture is then hardened and shaped at the same time. For this purpose, the liquid or pasty mixture may, for example, be poured into molds, applied to surfaces or used to fill cavities, joints or cracks. The continuous production of plate goods is also possible, e.g. by the so-called double conveyor belt technique. Further details of the methods which can be used in the preparation of the flexible products of the invention are described in Kunststoff-Handbuch, Volume VII (Polyurethane), Vieweg, Höchtlen, published by Carl Hanser Verlag Munich, 1966.

In cases where the continuous organic matrix is thermoplastically deformable as a result of suitable choice of the starting components, the primary emulsion may first be hardened and made up into shavings, granulates or powders which may subsequently be thermoplastically deformed in known manner, e.g. by means of extruders, injection molding machines, calender rollers or the like and they may be foamed up, e.g. with blowing agents. Semi-finished goods such as panels or sections may also be produced which may subsequently be thermoplastically formed, e.g. by deep-drawing. Foams may, of course, also be produced with the aid of inert gases, particularly air. For example, one of the components may first be foamed up with air and then added to the others. Furthermore, the components may be mixed, for example with the aid of compressed air, so that a foam is formed directly and this is then molded and hardened at the same time.

The water in the mixture may also take over the function of blowing agent, especially if mixing of the components is carried out under pressure at temperatures above 100° C so that when the material leaves the apparatus the pressure is released and foaming sets in.

Finely divided metal powders, e.g. calcium, magnesium, aluminum or zinc powder may also act as blowing agents due to the hydrogen evolved in the presence of the alkali metal silicate solution, and these metal powders at the same time have a hardening and strengthening effect.

Production of flexible foams in accordance with the invention is basically carried out by mixing the above described reactants in one or more stages in a discontinuously or continuously operating mixing apparatus and then leaving the resulting mixture to foam up and harden, usually outside the mixing apparatus in molds or on suitable supports. The required reaction temperature of between about 0° and 200° C, preferably 50° to 160° C, can be obtained either by heating one or more of the reactants before the mixing process or by heating the mixing apparatus itself or by heating the reaction mixture after the components have been mixed. Combinations of these or other methods may, of course, also be used for adjusting the reaction temperature. In most cases, sufficient heat is evolved in the reaction to enable the reaction temperature to rise above 100° C after the onset of the reaction or of foaming.

For any given formulation of components, the properties of the resulting foams, e.g. their density of the moist state, depend to some extent on the details of the mixing process, e.g. the form and speed of the stirrer, the form of the mixing chamber as well as the selected reaction temperature when foaming is started. This density may vary approximately between 0.02 and 1.3 g/cm$^3$. The moist, fresh foam in most cases has densities of between 0.1 and 0.8 g/cm$^3$. The dried foams may have closed or open cells. They are in most cases substantially open-celled and have densities between 0.01 and 1.1 g/cm$^3$.

Due to the behavior of the reaction mixture there are numerous possible uses for the process according to the invention and hence numerous fields of application, some of which will be outlined below. The possibility of either leaving the water in the hardened mixture as a desirable constituent in the foam or to protect the foam against loss of water by suitable application of coatings or laminates or of removing the water partly or completely by suitable drying processes, e.g. in a heating cupboard or with hot air, IR heating, ultra-sound or high-frequency can be selected from case to case according to the desired technical application.

The reaction mixture which contains a blowing agent and an organic compound having reactive hydrogen may be spread-coated on hot or cold supports or supports exposed to IR or HF radiation or after passing through the mixing apparatus the mixture may be sprayed on these supports with the aid of compressed air or by the airless spraying process. It can then foam up and harden on these supports to form a filling or insulating or moisture-proofing coating. The foaming reaction mixture may also be forced, cast or injection-molded into cold or heated molds, which may be relief molds, solid molds or hollow molds, and they may then be left to harden in these molds optionally under pressure at room temperature or temperatures up to 200° C, optionally using a centrifugal casting process. At this stage, reinforcing elements may well be added if desired. These may be inorganic and/or organic or metal wires, fibers, fleeces, foams, woven fabrics, supporting structures, etc. These may be incorporated e.g. by the fibrous web impregnation process or by processes in which, for example, reaction mixtures and reinforcing fibers are together applied to the mold, e.g. by means of spray apparatus. The molded products obtainable in this way may be used as building elements e.g. in the form of foamed or unfoamed sandwich elements which either may be used directly or may first be laminated with metal, glass, plastics, or the like. The advantageous fire characteristics in the moist or dry state is an advantage when the products are used in this form. However, the products may also be used as hollow bodies, e.g. as containers for goods which must be kept moist or cool, or as filter materials or exchangers, as catalyst carriers or carriers of other active substances, as decoration elements, furniture components and cavity fillings. They may also be used as heavy-duty lubricants and coolants or as carriers for such substances, e.g. in metal extrusion presses.

The water in the flexible elastomers has a very advantageous effect in the event of fire because its evaporation uses up a lot of energy and the products therefore remain "cold" for a long time. Self-ignition is prevented when large foam blocks are produced. The water in the finished elastomers is normally in the form of silicic acid hydrate. A more powerful chemical bond can be obtained by adding water-binding fillers. Particularly suitable fillers for this purpose are in particular hydraulic cements, anhydrite, gypsum and quick-lime but also silica gel, diatomaceous earth, clay and the like. It is particularly surprising that even the addition of these water-binding fillers does not spoil the elastomeric character of the materials according to the invention. The inexpensive filled foams of polyols, isocyanates, water glass and fillers obtained in this way are eminently suitable particularly for use as shock-absorbing materials, e.g. safety padding such as crash pads and the like.

The flexible products of the process may be used in the usual fields for compact or cellular elastomers, soft foams and semi-rigid foams, especially in cases where they are required to meet high standards of fire resistance. This applies particularly to the foams; thus the products obtainable by the process according to the invention are particularly suitable for producing upholstery materials, mattresses, elastic supports, car seats, damping materials, shock-absorbers and sound-damping insulations as well as for protection against heat and cold.

The invention will now be described in more detail with the aid of the examples.

EXAMPLES 1 THROUGH 23

Preparation of starting materials

1. Ionomer-prepolymer P 1

1800 g of a commercial-grade 4,4'-diphenylmethane diisocyanate (viscosity at 25° C 190 cP) are mixed at room temperature with 200 g of a trimethylol propane-initiated polyethylene glycol with an OH-number of 250.

A prepolymer is obtained which has an NCO-content of 25.6% and a viscosity of 1960 cP at 25° C.

144.5 g of a 33.3% by weight solution of sulphur trioxide in 1,2-dichloroethane are added dropwise over a period of 90 minutes to a solution of the prepolymer in 1000 g of 1,2-dichloroethane. This is followed by stirring for 1 hour at 70° C, after which excess 1,2-dichloroethane is distilled off and the product cooled.

viscosity at 25° C: 7500 cP
S-content: 0.85% = 2.1% of —$SO_3H$ calculated
NCO-content: 26%

2. Ionomer-prepolymer P 2

The procedure is as for P 1, except that sulphonation is carried out with 120 g of sulphur trioxide solution.

1848 g of the product free from 1,2-dichloroethane are neutralized with 22.5 g of triethylamine.

3. Organic polyisocyanate P 3

2000 g of a crude phosgenation product of aniline/formaldehyde condensation, adjusted to a viscosity of 420 cP at 25° C by distilling off some of the binuclear isocyanates, were diluted with 400 g of 1,2-dichloroethane, followed by the addition over a period of 90 minutes at room temperature of a solution of 47.7 g of sulphur trioxide in 97 g of 1,2-dichloroethane. The mixture was then stirred for 30 minutes at 70° C, filtered and the filtrate concentrated in vacuo.

A dark-colored clear isocyanate containing sulphonic acid groups is obtained.

NCO-content: 30.7%
S-content: 0.9% = 2.26% of $SO_3^-$
Viscosity: 1400 cP at 25° C 4. Organic polyisocyanate P 4

58.1 g of triethylamine are added dropwise at 35° C to 2060 g of polyisocyanate P 3. The resulting product is hazy, but stable and does not precipitate any sediment.

viscosity: 912 cP at 25° C

Preparation of a 48% aqueous sodium silicate solution S 1

980 g of solid alkaline sodium silicate ("Portil A", a Henkel product) are stirred into 3640 g of a 34% commercial-grade soda waterglass solution (8.6% of $Na_2O$; 25.4% of $SiO_2$; 38 Be), and the resulting mixture stirred at 60° C until a homogeneous, clear viscous solution is formed.

EXAMPLE 1

A solution of 160 g of S 1 and 9 g of water, heated to 35° C, is introduced with vigorous stirring into a mixture of 64 g of P 1, 16 g of P 2 and 24 g of monofluorotrichloromethane. After mixing for 20 seconds, the white homogeneous liquid is poured into a paper mold in which it immediately begins to foam. After another 40 seconds, a very hard, compression-resistant foam has formed. After drying at room temperature, a white foam is obtained which shows extreme hardness, high flexural elasticity and permanent heat stability. The foam does not burn and shows prolonged resistance to fire. A square measuring 8 × 8 × 1.5 cm can be slightly bent by hand, but does not break.

EXAMPLE 2

A solution of 240 g of S 1 and 13.5 g of water, heated to 40° C, is introduced with vigorous stirring into a mixture of 96 g of P 1, 24 g of P 2 and 45 g of monofluorotrichloromethane. After mixing for 20 seconds, the white homogeneous thick paste is cast into a paper mold in which it immediately foams. After another 45 seconds, a very hard, compression-resistant foam has formed, adhering very firmly to the mold. A block measuring 9 × 8 × 6.5 cm is cut out and dried in air. No shrinkage occurs during drying; elasticity modulus, compressive strength and flexural strength increase. Despite its extreme hardness, the material rebounds in the drop test and is not damaged. Unit weight approximately 300. The foam is substantially white and does not show any discoloration after one month.

EXAMPLE 3

The procedure is as in Example 2, except that 30 g of synthetic anhydrite are homogeneously stirred into the mixture of P 1 and P 2 before the expanding agent is added. 35 seconds after the mass has been cast into the mold, the foam formed can no longer be indented. The properties of the product correspond to those of Example 2. Unit weight approximately 340. The foam is white.

EXAMPLE 4

96 g of P 1, 24 g of P 2 and 2 g of 1,3-propane diol are mixed and the resulting mixture left to stand for 40 minutes. As in Example 2, the reaction mixture is foamed with 65 g of fluorotrichloromethane and with a mixture of 300 g of S 1 and 18 g of water. A white, extremely hard, elastic and compression-resistant foam is obtained. The foam is not inflammable and shows prolonged fire resistance.

EXAMPLE 5

The procedure is as in the preceding Example, except that 80 g of fluorotrichloromethane and 520 g of S 1 are used. The very fine-pored foam formed in initially thermoplastic and can readily be released from the mold. It is subsequently hardened by drying in air, after which it shows extremely high resistance to fire.

EXAMPLE 6

The procedure is as in Example 4, except that 30 g of trichlorofluoromethane and 40 g of S 1 are used. A very hard, coarse-pored lightweight foam of high compressive and flexural strength is obtained.

EXAMPLE 7

The procedure is as in Example 4, except that 20 g of trichlorofluoromethane and 20 g of S 1 are used. A somewhat brittle, extremely hard and very coarse-pored lightweight foam of high compressive strength is obtained.

EXAMPLE 8

About 96 parts of P 1, about 24 parts of P 2 and about 50 parts of synthetic anhydrite are homogeneously mixed with about 30 g of trichlorofluoromethane, after which about 50 parts of S 1 are stirred in. A thick mortar is obtained which, after forming, hardens into a hard concrete-like material. The product is stone-hard and rebounds when dropped onto flagstones.

EXAMPLE 9

72 g of P 3, 18 g of P 4 and 35 g of trichlorofluoromethane are homogeneously mixed and foamed with a solution of 180 g of S 1 and 20 g of water heated to 50° C. An extremely hard tough elastic foam of high compressive and flexural strength, coupled with extremely high dimensional stability under heat and toughness, is obtained after 2 minutes. Unit weight 350. The foam is non-inflammable.

EXAMPLE 10

The following components were used:
16000 g of sulphonated polyphenyl-polymethylene-polyisocyanate obtained by aniline-formaldehyde condensation followed by phosgenation and sulphonation with gaseous sulphur trioxide (sulphur content: 0.98%, isocyanate content: 30.2%, viscosity 1200 cP at 22° C; U.S. Ser. No. 363,436 filed May 24, 1973,
1600 g of trichlorofluoromethane,
8000 g of quick-setting cement,
12000 g of aqueous sodium silicate solution (44% solids content, $SiO_2:Na_2O = 2:1$),
40 g of the sodium salt of a sulphochlorinated $C_{10}$-$C_{14}$ paraffin mixture as emulsifier, and
240 g of N,N,N-($\omega$-dimethylamine-n-propyl) hexahydrotriazine as catalyst.

The sulphonated polyisocyanate was thoroughly mixed with the quick-setting cement and trichlorofluoromethane at room temperature, the sodium silicate solution, emulsifier and catalyst were also mixed, and the two mixtures were then vigorously stirred together, using a high-speed stirrer for 40 seconds. The reaction mixture was poured into an open-box mold. It began to foam after 60 seconds and solidified after only 100 seconds to form a foam concrete with high strength and regular cell structure. The reaction mixture heated up to about 120° C during the foaming and hardening process. Samples were removed from the material when cold and used to determine mechanical, physical and analytical data:

| | | |
|---|---|---|
| Density | 180 | kg/m$^3$ |
| Compression strength, $\delta df$ | | |
| at 23° C | 12.9 | kg.wt./cm$^2$ |
| at 170° C | 12.6 | kg.wt./cm$^2$ |
| Coefficient of thermal conductivity | 0.050 | kcal/m/h/° C |
| Tensile strength $\delta_B$ | 8.7 | kg.wt./cm$^2$ |
| Elongation at break $\epsilon_B$ | 1.1 | % |
| Flexural strength $\delta_{bB}$ | 12.9 | kg./wt./cm$^2$ |
| Resistance to bending in the heat [at f = 10.0 mm] | 218 | ° C |
| Volumetric change | | |
| 3 h −60° C | 0 | % |
| 5 h +200° C | 0 | % |
| Open cellularity | 92 | vol. −% |
| Permeability to water vapor | 89 | g/m$^2$/day |
| Absorption of water vapor | 22.3 | % by weight |
| Water absorption | 13 − 14 | vol −% |

A foam concrete with a density of 240 kg/m$^3$ produced from the same formulation was found to have the following mechanical properties:

| | | |
|---|---|---|
| Compression strength | 21.2 | kg.wt./cm$^2$ |
| Flexural strength | 28.5 | kg./wt./cm$^2$ |
| Shear modulus | 1717 | kg.wt./cm$^2$ |

EXAMPLE 11

The following components were used:
150 g of sulphonated polyisocyanate according to Example 10,
20 g of trichlorofluoromethane,
100 g of quick-setting cement,
150 g of sodium silicate solution according to Example 10,
0.5 g of emulsifier according to Example 10,
3 g of catalyst according to Example 10.

The components were mixed as described in Example 10 except that the cement was divided among the polyisocyanate and sodium silicate solution in equal parts by weight. The stirring time was 15 seconds and the reaction mixture started to foam after 32 seconds and had solidified with evolution of heat after 55 seconds.

When cold, the foam concrete had a density of 235 kg/m$^3$ and a compression strength of 19.1 kg.wt./cm$^2$.

EXAMPLE 12

The following components were used:
90 g of sulphonated polyphenyl-polymethylene-polyisocyanate of Example 10,
70 g of TDI residue (residue of tolylene diisocyanate distillation, solid pan residue approximately 15% by weight NCO),
20 g of trichlorofluoromethane,
200 g of cement according to Example 10,
150 g of sodium silicate solution according to Example 10,
1 g of triethylamine as catalyst,
0.2 g of emulsifier according to Example 10.

The sulphonated polyisocyanate, TDI residue, trichlorofluoromethane and 50 g of cement were first mixed together and the mixture of aqueous sodium silicate solution, triethylamine, emulsifier and remaining cement was then added. The whole mixture was then vigorously stirred for 13 seconds, started to foam up 15 seconds after the beginning of the mixing process and hardened within 45 seconds. The resulting foam concrete has a density of 348 kg/m$^3$ and a compression strength of 20 kg.wt./cm$^2$.

EXAMPLE 13

The following components were used:
200 g of sulphonated polyisocyanate according to Example 10,
20 g of trichlorofluoromethane,
100 g of synthetic anhydrite,
150 g of sodium silicate solution according to Example 10,
3 g of catalyst according to Example 10,
0.5 g of emulsifier according to Example 10,
1 g of potassium sulphate.

The components were mixed as described in Example 1 but the synthetic anhydrite was first stirred up with the polyisocyanate. The total mixing time was 20 seconds, the foaming process started after 45 seconds and the reaction mixture had solidified after 78 seconds. The foam concrete has a density of 240 kg/m$^3$ and a compression strength of 22.8 kg.wt./cm$^2$.

EXAMPLE 14

The following components were used:
160 g of sulphonated polyisocyanate according to Example 10,
16 g trichlorofluoromethane,
80 g of quick-setting cement,
120 g of sodium silicate solution,
2.4 g of catalyst according to Example 10,
0.4 g of emulsifier according to Example 10.

The reactants were mixed as described in Example 10, and used to manufacture by hand panels measuring 20 × 20 × 1 cm$^3$ in a metal tool with a feed opening on the narrow side. The mold was kept at a temperature of 45°–50° C. The foam concrete panels were removed after about 15 minutes and then kept at a temperature of 75°–100° C. for 5 hours. These foam concrete parts were found to have completely smooth surfaces and a well developed integral foam structure in the interior. The following mechanical properties were determined by taking results from six such foam concrete panels:

| Density | 500–600 | kg/m$^3$ |
| --- | --- | --- |
| Tensile strength | 60–70 | kg.wt./cm$^2$ |
| Elongation at break | 1–2 | % |
| Compression strength | 40–50 | kg.wt./cm$^2$ |
| Flexural strength | 150–200 | kg.wt./cm$^2$ |
| Edge Fiber Elongation | 2–3 | % |
| E-Modulus (from bending test) | above 8000 | kg.wt./cm$^2$ |
| Heat resistance | 220 | ° C |

EXAMPLE 15

Component 1:
150 g of a 20% solution of TDI residue of Example 12 in 4,4′-diphenylmethane diisocyanate (MDI) (NCO content 30% viscosity 1900 centipoises)
100 g of synthetic anhydrite
25 g of trichlorofluoromethane Component 2:
150 g of a 44% aqueous sodium silicate solution (Na$_2$O:SiO$_2$ molar ratio 1:2)
2.5 g of triethylamine After mixing the components a fine-celled foam is obtained.

| Density | 178 kg/m$^3$ |
| --- | --- |
| Compression strength | 8 kg.wt./cm$^2$ |

EXAMPLE 16

Component 1:
150 g of a 30% solution of TDI residue of Example 12 in (MDI) as in Example 15.
40 g of sulphonated polyisocyanate according to Example 10,
180 g of calcium oxide
35 g of trichlorofluoromethane Component 2:
220 g of a 44% aqueous sodium silicate solution (Na$_2$O:SiO$_2$ molar ratio 1:2)
2 g of triethylamine The components are thoroughly mixed for 10 seconds and the mixture poured into a paper mold. The composition starts to foam up 38 seconds after the beginning of the mixing process. Steam develops after 55 seconds and solidification takes place. A very uniform foam concrete is obtained of medium pore structure.

| Density | 193 kg/m$^3$ | values ascertained 2 hours after production of foam |
| --- | --- | --- |
| Compression strength | 9.8 kg.wt./cm$^2$ | |

The product expands slightly on solidifying; no surface cracks appear.

If cement is used as a water-binding filler instead of lime, there is a slight loss in volume. By selecting a suitable lime/cement ratio the loss in volume or expansion can be adjusted as desired. In particular an adjustment can be made so that a loss in volume of exactly 0 is achieved.

The foams based on lime possess excellent fire resistance. When subjected to the action of an oxidizing flame for a prolonged period of time an inorganic foam structure is obtained.

EXAMPLE 17

200 g of a polyisocyanate, which was obtained by distilling so much diisocyanatodiphenyl methane off the crude phosgenation product of an aniline/formaldehyde condensate that the distillation residue had a viscosity of 1700 centipoises at 25° C (2 nucleus fraction: 40.3% by weight, 3 nucleus fraction: 34.0% by weight, fraction of high nuclear polyisocyanate 25.7% by weight), were mixed with 200 g of quick-setting cement and 20 g of trichlorofluoromethane.

To this mixture there was added a mixture consisting of 150 g of waterglass (solid content 44% by weight, molar ratio Na$_2$O:SiO$_2$ = 1:2), 1.5 g triethylamine, 0.2 g of emulsifier (50% of an aqueous solution of the sodium salt of a sulphochlorinated paraffin mixture C$_{10}$–C$_{14}$, "MERSOLAT K 30") and 100 g of quick-setting cement.

The mixtures were thoroughly mixed for 15 seconds with a high-speed stirrer and poured into a paper packet. The reaction mixture began to foam up 48 seconds after the start of the mixing process and had solidified 32 seconds later to form a hard, inorganic-organic foam of not quite uniform cell structure which had a density of 842 kg/m$^3$ and a compression strength of 116.5 kg.wt./cm$^2$.

In the above preparation of S-1 "Portil A" has the following composition:
SiO$_2$ - 55 weight-%
Na$_2$O - 27 weight-%
H$_2$O - 18 weight-%
with the following particle size:
0.8 mm - 2%
0.4 mm - 3%
0.2 mm - 15%
0.1 mm - 50%
0.05 mm - 30%
less than 0.05 mm - 7%

EXAMPLES 18 THROUGH 43

Preparation of the starting materials (I)
1000 g of a linear polypropylene glycol with a molecular weight of 2000 which has been started on 1,2-propylene glycol and 174 g (1 mol) of tolylene diisocyanate (isomeric mixture 80 : 20) are stirred together for 2.5 hours at 80° C.

The resulting prepolymer has an NCO-content of 3.7% and a viscosity of 3825 cP at 25° C.

1124 g of this prepolymer are mixed with 32 g of sulphur trioxide in the course of 4.5 hours with stirring at 40° C to 50° C. To provide the sulphur trioxide, 65% oleum is heated and the sulphur trioxide which is evolved is passed over the prepolymer. Sulphur content 1.09%, viscosity: 20 000 cP.

(II)
1000 g of a branched polypropylene glycol ether with a molecular weight of 3000 which has been started on trimethylolpropane are reacted with tolylene diisocyanate as under (I). Viscosity: 10 000 cP at 25° C.

(III)
1137 g of prepolymer (II) are mixed with 30 g of sulphur trioxide as described under (I). Sulphur content: 1.13% Viscosity: 50 000 cP.

(IV)
2000 g of a mixed polyether [alkoxylated (ethylene oxide: propylene oxide = 20 : 80 percent by weight) trimethylolpropane/1,2-propylene glycol mixture] (OH-number 42) are reacted with 261 g of tolylene diisocyanate as under (I). Viscosity: 6 100 cP at 25° C.

2162 g of the prepolymer are mixed with 24 g of sulphur trioxide as described under (I). Sulphur content: 0.47%

(V)
2000 g of a polypropylene glycol which has been started on trimethylolpropane and contains 17 percent by weight of polyethylene glycol and groups (OH-number 28) are reacted with 174 g of tolylene diisocyanate as under (I). Viscosity: 7 500 cP at 25° C.

(VI)
2082 g of the prepolymer (V) are mixed with 23 g of sulphur trioxide as described under (I). Sulphur content: 0.38%, viscosity: above 100 000 cP at 25° C.

(VII)
The dinuclear content is distilled out of a crude phosgenation product of an aniline/formaldehyde condensate until the distillation residue has a viscosity of 400 cP at 25° C. The resulting product is sulphonated to a sulphur content of 1% by mixing it with sulphur trioxide as described under (I). Viscosity: 1 300 cP at 25° C.

(VIII)
1000 g of a crude phosgenation product of an aniline/formaldehyde condensate which has an NCO-content of 31.4% and a viscosity of 100 cP is diluted with 200 g of 1,2-dichloroethane. 71.5 g of a 33% solution of sulphur trioxide in 1,2-dichloroethane are then added at room temperature in the course of 45 minutes. Dichloroethane is then distilled off under vacuum. Sulphur content: 0.67%, Viscosity: 200 cP at 25° C.

(IX)
16 kg of a polyethylene oxide with a molecular weight of 1200 which has been started on n-butanol are melted in a 100-liter vessel at 80° C. 80 kg of a crude commercial phosgenation product of an aniline/formaldehyde condensate which has an NCO-content of 31% and a viscosity of 400 cP are added all at once with stirring and cooling and the mixture is then stirred for a further 5 hours at 80° C. A nonionic-hydrophilically modified isocyanate is obtained which has an NCO-content of 24.6% and a viscosity of 1500 cP (25° C.).

(X)
A trifunctional polypropylene glycol ether which has been started on trimethylolpropane and contains 17% of polyethylene glycol end groups (primary OH-groups); OH-number 28.

(XI)
Tolylene diisocyanate (2,4/2,6-isomeric mixture, ratio 80 : 20).

(XII)
Unsulphonated (VII).

EXAMPLE 18

100 g of (I) and 50 g of (XI) are mixed with 30 g of T (trichlorofluoromethane). A mixture of 100 g of 44% W (sodium water glass) (Na$_2$O : SiO$_2$ = 1 : 2), 2 g of K (catalyst = triethylamine) and 3 g of M (50% aqueous mersolat solution K 30% sodium salt of a sulphochlorinated paraffin mixture) is rapidly added and the mixture is vigorously stirred for 15 seconds. It is then poured out into a paper mold. The foaming process sets in after 27 seconds and is completed after 38 seconds. The resulting foam has coarse pores and is moderately elastic.

EXAMPLE 19

100 g of (II)  ⎫
50 g of (IX)   ⎬ component 1
30 g of T      ⎭

150 g of W according to Example 18   ⎫
2 g of triethylamine                  ⎪
3 g of M according to Example 18      ⎬ component 2
50 g of quick-setting cement          ⎭

Component 1 and component 2 are vigorously stirred together for 15 seconds and the resulting thick emulsion is poured into a paper mold. The foaming process begins after 33 seconds and is completed after 52 seconds. The resulting foam has a medium pore size and is elastic.

EXAMPLE 20

100 g of (III) ⎫
50 g of (IX)   ⎬ component 1
30 g of T      ⎭

180 g of W according to Example 18   ⎫
2 g of triethylamine                  ⎪
3 g of M according to Example 18      ⎬ component 2
70 g of quick-setting cement          ⎭

Preparation of the foam according to Example 19.

| Onset of foaming: | after 45 seconds, |
|---|---|
| end of foaming: | after 77 seconds, |
| pore size: | medium, |
| elasticity: | moderate. |

EXAMPLE 21

100 g of (III) ⎫
50 g of (IX)   ⎬ component 1
40 g of T      ⎭

200 g of W according to Example 18   ⎫
2 g of triethylamine                  ⎪
3 g of M according to Example 18      ⎬ component 2
100 g of quick-setting cement         ⎭

Preparation of the foam according to Example 19.

| Onset of foaming: | after 73 seconds, |
|---|---|
| end of foaming: | after 130 seconds, |
| pore size: | medium coarse, |
| elasticity: | moderate. |

The tough foam is suitable for use as filling foam, e.g. in motorcar safety parts. After drying, about 60% of the foam consists of inorganic substance and the foam consequently has a high resistance to fire.

EXAMPLE 22

50 g of (II)  
50 g of (III)  
50 g of (IX) } component 1  
30 g of T 150 g of W according to Example 18  
2 g of triethylamine } component 2  
1.5 g of M according to Example 18

Preparation of the foam according to Example 19.

| Onset of foaming: | after 45 seconds, |
|---|---|
| end of foaming: | after 62 seconds, |
| pore size: | medium, |
| elasticity: | good immediately after preparation of the foam, moderate after drying. |

EXAMPLE 23

130 g of (III)  
20 g of (IX) } component 1  
30 g of T 150 g of W according to Example 18 } component 2  
3 g of triethylamine Preparation of the foam according to Example 19.

| Onset of foaming: | after 36 seconds, |
|---|---|
| end of foaming: | after 70 seconds, |
| pore size: | medium, |
| elasticity: | moderate. |

EXAMPLE 24

90 g of (VI)  
60 g of (IX) } component 1  
40 g of T 100 g of W according to Example 18  
1 g of triethylamine } component 2  
1.5 g of M according to Example 18

| Stirring time: | 14 seconds, |
|---|---|
| onset of foaming: | after 30 seconds, |
| end of foaming: | after 43 seconds, |
| pore size: | coarse, |
| elasticity: | good immediately after preparation of the foam, moderate after drying. |

EXAMPLE 25

90 g of (VI)  
60 g of (IX) } component 1  
40 g of T 100 g of W according to Example 18 } component 2  
0.5 g of triethylamine Preparation of the foam according to Example 19

| Pore size: | very coarse, |
|---|---|
| elasticity: | very good. |

EXAMPLE 26

120 g of (IV)  
30 g of (IX) } component 1  
35 g of T 100 g of W according to Example 18  
2 g of triethylamine } component 2  
1.5 g of triethylamine Preparation of the foam according to Example 19

| Stirring time: | 13 seconds, |
|---|---|
| onset of foaming: | after 45 seconds, |
| end of foaming: | after 75 seconds, |
| pore size: | very coarse, |
| elasticity: | moderate-good. |

Examples 27 to 36 are shown in the following table 1. The foam is prepared as described in Example 19. The figures given in the table refer to "quantity in g" unless otherwise indicated.

TABLE 1

| | EXAMPLES | | | | | | | | | |
|---|---|---|---|---|---|---|---|---|---|---|
| | 27 | 28 | 29 | 30 | 31 | 32 | 33 | 34 | 35 | 36 |
| (IV) | | 120 | | | | | | | | |
| (V) | | | | 60 | 70 | 70 | 70 | 90 | 90 | 90 |
| (VI) | 90 | | 90 | 30 | 20 | 20 | 20 | | | |
| (VII) | | | | | | | | 20 | 50 | |
| (VIII) | | | | | | | | | | 60 |
| (IX) | 60 | 30 | 60 | 60 | 60 | 60 | 60 | 40 | 10 | |
| T | 40 | 35 | 30 | 40 | 45 | 50 | 50 | 50 | 50 | 50 |
| W | 100 | 100 | 100 | 100 | 150 | 150 | 150 | 150 | 150 | 150 |
| Tri-ethyl-amine | 1 | 2 | 0.5 | | | | 1 | 1 | 0.5 | 0.5 |
| Quick-setting cement | | | | | | 100 | 200 | 100 | | |
| Silico-cell | 0.5 | 0.5 | 0.5 | 0.8 | 0.8 | 0.8 | 0.8 | 1 | 0.8 | 1.2 |

TABLE 1-continued

| | EXAMPLES | | | | | | | | | |
|---|---|---|---|---|---|---|---|---|---|---|
| | 27 | 28 | 29 | 30 | 31 | 32 | 33 | 34 | 35 | 36 |
| 7200[1] Stirring time (in sec.) | 13 | 13 | 15 | 15 | 15 | 15 | 20 | 20 | 18 | 20 |
| Onset of foaming (after seconds) | 35 | 40 | 28 | 26 | 30 | 33 | 34 | 45 | 44 | 48 |
| End of foaming (after seconds) | 48 | 80 | 35 | 50 | 62 | 68 | 67 | 78 | 70 | 68 |
| Pore size | coarse | fine | medium | fine | fine | fine | fine | fine | medium | fine |
| Elasticity | very good | moderate; tough | very good | good | good | medium good | medium | medium | very good | good |

[1]commercial foam stabilizer based on polysiloxane-polyalkylene glycol copolymers (ICI).

EXAMPLES 37 TO 43

Preparation by the one-shot-process. The components indicated are added together shortly before they are mixed. The stirring time is 15 seconds.

The figures given in Table 2 below also represent "quantity in g" unless otherwise indicated.

EXAMPLE 44

200 g of a phosgenation product of aniline/formaldehyde condensation which had been adjusted to a viscosity of 400 cP at 25° C by partial distillation were heated to 50°–60° C with 4.87 g (0.044 mol) of pyrocatechol for 1 hour. The viscosity rises only slightly during this heating process.

TABLE 2

| | EXAMPLE | | | | | | |
|---|---|---|---|---|---|---|---|
| | 37 | 38 | 39 | 40 | 41 | 42 | 43 |
| (X) | 100 | 100 | 100 | 100 | 100 | 100 | 100 |
| (XI) | 10 | 10 | 10 | 10 | 10 | 10 | 10 |
| (VII) | 50 | 25 | | | | | |
| (XII) | | 25 | 50 | 60 | 50 | 60 | 60 |
| (IX) | 10 | 10 | 10 | | 10 | | |
| T | 50 | 40 | 35 | 35 | 35 | 35 | 35 |
| W | 150 | 150 | 150 | 150 | 200 | 150 | 200 |
| Triethylamine | 0.5 | | | | | | |
| Silicocell 7200[1] | 0.8 | 1 | 1 | 1 | 1 | 5 | 5 |
| Onset of foaming (after sec.) | 24 | 25 | 35 | 35 | 35 | 35 | 38 |
| End of foaming after sec.) | 36 | 39 | 47 | 44 | 47 | 47 | 52 |
| Pore size | medium | fine-medium | fine-medium | fine-medium | fine-medium | fine | fine |
| Elasticity | very good | good | good-very good | good-medium | medium | good-very good | good-very good |

[1]commercial foam stabilizer based on polysiloxane-polyalkylene glycol copolymers (ICI).

The density and compression resistance were determined in some of the soft foams prepared in the previous examples:

| Example | Density kg/m³ | Compression resistance according to DIN 53 577 [KPa] |
|---|---|---|
| 19 | 157 | 36.4 |
| 21 | 212 | — |
| 22 | 177 | — |
| 23 | 154 | — |
| 25 | 100 | — |
| 28 | 100 | — |
| 29 | 80 | 11.6 |
| 30 | 51 | — |
| 33 | 94 | 6.0 |
| 35 | 62 | 10.8 |
| 36 | 60 | 9.0 |
| 37 | 48 | — |
| 38 | 67 | — |
| 39 | 67 | — |
| 40 | 72 | — |
| 42 | 58 | — |
| 43 | 84 | — |

The resulting isocyanate modified with phenolic hydroxyl groups was used for the production of an inorganic-organic foam according to the following formulation:

| 90 | g | of modified isocyanate | component I |
|---|---|---|---|
| 20 | g | of trichlorofluoromethane | |
| 160 | g | of 54% water glass (Na$_2$O:SiO$_2$ = 1:1) | component II |
| 20 | g | of water | |
| 2 | g | of triethylamine | |

The components are mixed with the aid of a high-speed stirrer and the thin, liquid emulsion is poured into a paper mold. A compression-resistant hard foam with a density of 250 is obtained

| Foam data: | |
|---|---|
| End of stirring: | after 14 seconds |
| onset of rising: | after 28 seconds |
| end of rising: | after 38 seconds |

-continued

| | |
|---|---|
| hardening with evolution of steam: | after 46 seconds |
| cellular structure: | coarse |

The foam is flame-resistant and has good fire characteristics.

The modified isocyanate is stable in storage for more than 8 months. After 10 months, the viscosity is 1020 cP. When the foaming test is repeated, a hard foam with a density of 300 and a finer, very regular cell structure is obtained.

Comparison experiment:

If the foaming test is carried out with an unmodified isocyanate as starting material, a coarse emulsion is obtained which hardens only slowly over a period of about 15 minutes. No foam was obtained.

EXAMPLES 45 - 55

Isocyanates modified with the given phenols were prepared and foamed as described in Example 44. The reaction conditions and results are shown in the table. The quantities given are based on 200 g of the isocyanate described in Example 44. The foam formulations correspond to that of Example 44.

tion residue has a viscosity of 100 cP at 25° C. (Dinuclear portion: 59.7% by weight; trinuclear portion: 21.3% by weight; proportion of higher nuclear polyisocyanates: 19.0% by weight).

III
Similarly prepared polyisocyanate with a viscosity of 200 cP at 25° C. (Dinuclear portion: 44.3% by weight; trinuclear portion: 23.5% by weight; proportion of higher nuclear polyisocyanates: 32.2% by weight).

IV
Similarly prepared polyisocyanate with a viscosity of 400 cP at 25° C. (Dinuclear portion: 45.1% by weight; trinuclear portion: 22.3% by weight; proportion of higher nuclear polyisocyanates: 32.6% by weight).

V
Similarly prepared polyisocyanate with a viscosity of 500 cP at 25° C. (Dinuclear portion: 40.6% by weight; trinuclear portion: 27.2% by weight; proportion of higher nuclear polyisocyanates: 32.2% by weight).

VI
Similarly prepared polyisocyanate with a viscosity of 700 cP at 25° C. (Dinuclear portion: 40.3% by

| Example | Added phenol | g | Reaction Conditions | Onset of foaming after (seconds) | End of foaming after (seconds) | 100° C after (seconds) | Compression strength | Size of cells |
|---|---|---|---|---|---|---|---|---|
| 45 | Resorcinol | 2.2 | 20′ 50° | 25 | 30 | 45 | good | very coarse |
| 46 | 4-chloro-1,3-dihydroxy-benzene | 2.9 | 30′ 60–85° | | | | good | fine |
| 47 | 2-amino-1-hydroxybenzene | 2.2 | 3h 50–90° | 30 | 36 | 46 | good | coarse |
| 48 | hydroquinone | 2.2 | 1h 100° | 24 | 34 | 40 | good | medium |
| 49 | bisphenol A | 4.6 | 90′ 50–110° | 28 | 40 | 53 | good | coarse |
| 50 | 6-chloro-3-aminophenol | 2.9 | 30′ 85–125° | 15 | 33 | 40 | good | medium fine |
| 51 | bis-4-hydroxy phenyl-sulphone | 5.0 | 4h 50–160° | 30 | 36 | 45 | good | coarse |
| 52 | 2,2′-dihydroxy-diphenyl | 18.6 | 30′ 60–70° | 15 | 46 | | good | very coarse |
| 53 | 2,3-dihydroxy-naphthalene | 3.2 | 3h 50–75° | 30 | 37 | 46 | good | coarse |
| 54 | 3-chloro-4-hydroxy-benzoic acid | 3.5 | 1h 100–140° | 29 | 39 | 48 | good | coarse |
| 55 | 1,6-dihydroxy-naphthalene | 3.2 | 2h 80° | 27 | 40 | 45 | good | medium |

EXAMPLE 56

Example 44 was repeated but using 0.5 g of pyrocatechol which was dissolved in 1 g of a 70% urea solution. The isocyanate modified in this way was vigorously mixed with 120 g of 40% water glass (Na$_2$O:SiO$_2$ = 1:1), a very finely divided emulsion being formed which was suitable for use as casting composition and hardened within 3 minutes in an exothermic reaction to form a stone-hard, tough solid.

EXAMPLES 57–106

Starting materials

I
Reaction product of 1 mol of tripropylene glycol with 5 mols of 4,4′-diphenylmethane diisocyanate (23% by weight of isocyanate).

II
Diisocyanatodiphenylmethane is distilled off the crude phosgenation product of an aniline formaldehyde condensate in such a quantity that the distillaweight; trinuclear portion: 34.0% by weight; proportion of higher nuclear polyisocyanates: 25.7% by weight).

VII
20% solution of a distillation residue from the distillation of commercial tolylene diisocyanate in the crude phosegnation product of an aniline formaldehyde condensate. Viscosity at 25° C: 1260 cP; NCO content: 29.3% by weight.

VIII
40% solution of the above mentioned distillation residue in the crude phosgenation product of an aniline formaldehyde condensate. Viscosity at 25° C: 2970 cP; NCO content: 29.6% by weight.

General method of preparation:

The aromatic polyisocyanate was introduced into the reaction vessel and the compound containing carboxyl groups was added at a given temperature. The reaction mixture was then stirred, filtered if necessary and any solvent present was distilled off under a reduced pressure.

| Hydroxycarboxylic acids | Starting materials for the liquid aromatic polyisocyanates used in Examples 63 thru 126 prepared from (molar ratio 1:1) in 1-3 hours at 105-125° C | OH number | acid number |
|---|---|---|---|
| AA | 1,1,1-Trimethylolpropane/tetrahydrophthalic acid anhydride | 400 | 209 |
| BB | 1,1,1-Trimethylolpropane/tetrahydrophthalic acid anhydride* | 328 | 227 |
| CC | 1,1,1-trimethylolpropane . 3 EOX/phthalic acid anhydride | 258 | 116 |
| DD | 1,1,1-trimethylolpropane/maleic acid anhydride | 392 | 133 |
| EE | 1,1,1-trimethylolpropane . 3EOX/tetrahydrophthalic acid anhydride | 260 | 120 |
| FF | 1,1,1-trimethylolpropane/hexahydrophthalic acid anhydride | 372 | 188 |
| GG | 1,1,1-trimethylolpropane . 3EOX/glutaric acid anhydrid | 249 | 114 |
| HH | 1,1,1-trimethylolpropane . 3EOX/trimellitic acid anhydride | 192 | 173 |
| II | 1,1,1-trimethylolpropane . 3EOX/maleic acid anhydride | 278 | 129 |
| KK | glycerol/maleic acid anhydride | 453 | 231 |
| LL | 1,1,1-trimethylolpropane/phthalic acid anhydride | 372 | 189 |

*Molar ratio 1:1.2
EOX: ethylene oxide

Reaction to produce the liquid, aromatic polyisocyanates used in Examples 63 thru 126 (2 hours at 100° C)

| EXAMPLE | Polyisocyanate g | Type | Hydroxycarboxylic acid g | Type | $-COO^{(-)}$ groups % by weight | NCO % by wt. | Viscosity cP (25° C) |
|---|---|---|---|---|---|---|---|
| 57 | 1182 | II | 18 | EE | 0.15 | 29.1 | 160 |
| 58 | 1182 | III | 18 | EE | 0.15 | 30.2 | 320 |
| 59 | 1182 | IV | 18 | EE | 0.15 | 30.2 | 570 |
| 60 | 1182 | V | 18 | EE | 0.15 | 29.6 | 940 |
| 61 | 1182 | VI | 18 | EE | 0.15 | 29.2 | 1500 |
| 62 | 1182 | IV | 18 | AA | 0.16 | 29.4 | 680 |
| 63 | 1182 | IV | 18 | BB | 0.13 | 29.7 | 680 |
| 64 | 1182 | IV | 18 | CC | 0.10 | 30.0 | 550 |
| 65 | 1182 | IV | 18 | LL | 0.15 | 29.8 | 580 |
| 66 | 900 | III | 100 | II | 1.1 | 24.4 | 50,000 |
| 67 | 900 | IV | 100 | EE | 1.0 | 24.8 | 50,000 |
| 68 | 900 | VI | 100 | II | 1.1 | 23.2 | 50,000 |
| 69 | 800 | III | 200 | DD | 3.1 | 18.6 | thick liquid |
| 70 | 800 | III | 200 | FF | 2.0 | 20.8 | thick liquid |
| 71 | 800 | III | 200 | HH | 1.6 | 21.2 | thick liquid |
| 72 | 800 | III | 200 | KK | 3.5 | 18.2 | |
| 73 | 900 | I | 100 | EE | 0.15 | 18.2 | 1950 |
| 74 | 1182 | VII | 18 | GG | 0.16 | 28.8 | 2100 |
| 75 | 1182 | VIII | 18 | GG | 0.16 | 29.0 | 4500 |

Reaction to produce the polyisocyanates used in Examples 63 thru 126

| EXAMPLE | Polyisocyanate g | Type | Carboxylic acid g | Type | $-COO^{(-)}$ % by wt. | NCO % by wt. | Viscosity 25° C | Reaction conditions |
|---|---|---|---|---|---|---|---|---|
| 76 | 2166 | II | 33.5 | DMP | 0.5 | 29.2 | 420 | 2 hours/100° C |
| 77 | 2166 | II | 33.5 | DMP | 0.5 | 29.1 | 433 | 2 hours/140° C |
| 78 | 2133 | II | 67.0 | DMP | 1.0 | 27.4 | 730 | 6 hours/100° C |
| 79 | 2166 | IV | 33.5 | DMP | 0.5 | 29.5 | 670 | 2 hours/130° C |
| 80 | 2133 | IV | 67 | DMP | 1.0 | 28.6 | 5700 | 2 hours/130° C |
| 81 | 2100 | IV | 100 | DMP | 1.5 | 27.7 | 10,500 | 2 hours/130° C |
| 82 | 2160 | III | 40 | MDB* | 0.6 | 28.4 | 490 | 2 hours/100° C |
| 83 | 2160 | IV | 40 | DMB | 0.6 | 28.7 | 1070 | 2 hours/100° C |
| 84 | 2160 | VI | 40 | DMB | 0.6 | 27.2 | 1600 | 2 hours/100° C |
| 85 | 2120 | III | 80 | HS—(CH$_2$)$_2$—COOH | 1.7 | 22.0 | 670 | 2 hours/130° C |
| 86 | 2120 | III | 80 | HOOC—(CHCH)$_4$—COOH** | 0.8 | 18.0 | 11,000 | 2 hours/130° C |
| 87 | 2120 | III | 80 | salicyclic acid | 1.5 | 22.1 | 800 | 2 hours/130° C |
| 88 | 1230 | IV | 120 | B | 1.5 | 24.6 | 12,100 | 2 hours/130° C |

DMP = dimethylolpropionic acid
DMB = dimethylolbutyric acid
*reaction mixture contained 100 ml of methylisobutylketone; was distilled off
**formation of coarse sediment

NEUTRALIZATION EXAMPLE 89

78 g of hydroxycarboxylic acid EE with a hydroxyl number of 260 and an acid number of 120 are reacted with 1362 g of polyisocyanate III at 80° C for 2 hours and partially neutralized with increasing quantities of the base tri-n-butylamine. The isocyanate content and viscosity at 25° C are determined in each case. 10%, 20%, 30% and 50% of the carboxyl groups present in the polyisocyanate according to the invention are neutralized. The figures are shown in the table.

| g of Substance | g of Tri-butylamine | % of theory | $\eta_{25}$[cP] | NCO [%] |
|---|---|---|---|---|
| 170 | — | — | 2500 | 26.9 |
| 320 | 0.74 | 10 | 2050 | 25.8 |
| 320 | 1.48 | 20 | 1980 | 25.8 |
| 320 | 2.22 | 30 | 1900 | 25.9 |
| 320 | 3.70 | 50 | 1800 | 25.5 |

EXAMPLE 90

Partial neutralization followed by reaction with polyisocyanate according to Method III 39 g of hydroxycarboxylic acid EE with a hydroxyl number of 260 and an acid number of 120 are intimately mixed with 8.3 g of tri-n-butylamine. 50% of the theoretical amount of all the carboxyl groups present are converted into carboxylate groups with mild heating. The liquid product, which has only become slightly more viscous, is then mixed with 681 g of polyisocyanate III and the mixture is kept at 80° C with stirring for 1.5 hours. After filtering off traces of sediment, a liquid polyisocyanate which contains carboxyl groups and carboxylate groups is obtained which has the following characteristics:

Isocyanate content: 26.4% by weight
$\eta_{22}$: 2650 cP
Carboxyl group content (calculated): 0.27% by weight
Carboxylate group content (calculated): 0.27% by weight.

EXAMPLE 91

Grouting composition

50 Parts of polyisocyanate (Example 67) are mixed with 150 parts of polyisocyanate IV and then vigorously stirred up with 150 parts of 44% waterglass (Na$_2$O:SiO$_2$ = 1:2) using a high speed stirrer. 600 Parts of quick-setting cement are then added and the substance is mixed with a stirrer rod until a homogeneous, pliant mass which can be applied with a filling trowel has been formed. This remains completely suitable for application for up to 10 minutes, is still barely deformable after 2 hours and becomes stone hard and free from pores in about 5 hours. If desired, the mass may be hardened by the application of heat, for example at 80° C for 20 minutes.

EXAMPLE 92

Casting composition

The procedure is the same as described under Example 91 but only 100 parts of quick-setting cement are used (instead of 600 parts) and mixing is carried out for about 1 minute with a high speed stirrer. The composition obtained is suitable for casting and has excellent adherence both to organic surfaces and particularly to inorganic surfaces. It begins to set after 6 minutes, is still slightly deformable after 3 hours and has become rock hard after 24 hours. It is porous to only a minor extent. In this example also hardening may be accelerated by heating if desired (30 minutes at 80° C.).

EXAMPLE 93

Inorganic-organic silicate-based foam

| Component 1: | 200 g of polyisocyanate (Example 88) |
| | 20 g of trichlorofluoromethane |
| | 100 g of quicklime |
| Component 2: | 150 g of waterglass |
| | 3 g of catalyst (hexahydrotriazine derivative) |
| | 0.25 g of emulsifier, sodium salt of a sulphochlorinated C$_{10}$–C$_{14}$ paraffin mixture. |

Components 1 and 2 are mixed separately and then vigorously stirred together, using a high speed stirrer for 15 seconds, and the resulting mixture is then poured into a paper container. The resulting inorganic-organic foam was found to have a fine, regular pore structure and after drying (3 hours at 120° C) it had a density of 271 kg/m$^3$ and a compression strength of 26.4 kp/cm$^2$.

The following readings were taken during the foaming process:

| | |
|---|---|
| Stirring time | 20 seconds ($t_R$) |
| Resting time: | 25 seconds ($t_L$) (onset of foaming) |
| Complete reaction time: | 35 seconds ($t_A$) (end of foaming) |
| Rising height: | 6.5 cm |

EXAMPLE 94

The procedure is completely the same as that employed in Example 93 but only 150 g of the polyisocyanate according to the invention is used (Example 88). In this case, the density drops to 200 kg/m$^3$ and the compression strength to 14.8 kp/cm$^2$.

EXAMPLE 95

| Component 1: | 140 | g of polyisocyanate (Example 88) |
| | 150 | g of quick-setting cement |
| | 30 | g |
| | 23 | g of trichlorofluoromethane |
| Component 2: | 150 | g of waterglass |
| | 100 | g of quick-setting cement |
| | 1 | g of triethylamine |
| | 0.1 | g of the emulsifier from Example 93. |

The two components are mixed as described in Example 93 and result in an inorganic-organic foam with a regular, fine cell structure, a density of 272 kg/m$^3$ and a compression strength of 17.3 kp/cm$^2$.

EXAMPLES 96 TO 98

| Inorganic-organic lightweight foams | 102 | 103 | 104 |
|---|---|---|---|
| Polyisocyanate Example 59 | 100 g | 100 g | 100 g |
| Trichlorofluoromethane | 7 g | 8 g | 15 g |
| Waterglass | 75 g | 75 g | 75 g |
| Hexahydrotriazine derivative | 3.0 g | 1.5 g | — |
| Polyether polysiloxane* | 3.0 g | 3.0 g | 3.0 g |
| Rising height | 80 cm | 130 cm | 210 cm |
| Density (kp/cm$^2$) | 61 | 39 | 19 |

To prepare these lightweight foams which are free from fillers, polyisocyanate and blowing agent are first mixed, as are also the waterglass, activator and stabilizer*. The components are then mixed together with the aid of a high speed stirrer and poured into a paper container.

* = silicon content 10.4%, stabilizer.

The following table shows the results obtained in the practical Examples 99 to 106 (all figures given in grams unless otherwise indicated):

| EXAMPLE | 99 | 100 | 101 | 102 | 103 | 104 | 105 | 106 |
|---|---|---|---|---|---|---|---|---|
| Polyisocyanate 66 | 200 | 150 | 150 | — | — | — | — | — |
| Polyisocyanate 67 | — | — | — | 100 | — | — | — | — |
| Polyisocyanate 68 | — | — | — | — | 100 | 100 | 100 | 100 |
| II | — | — | — | — | — | — | 100 | — |
| III | — | — | 50 | — | — | — | — | 100 |
| IV | — | 50 | — | 100 | 100 | — | — | — |
| VI | — | — | — | — | — | 100 | — | — |
| Trichlorofluoromethane | 20 | 20 | 20 | 20 | 20 | 20 | 20 | 20 |
| Waterglass | 150 | 150 | 150 | 150 | 150 | 150 | 150 | 150 |
| Triethylamine | 2.5 | 2.5 | 2.5 | 2.5 | 2.5 | 2.5 | 2.5 | 2.5 |
| Emulsifier from Example 93 | 0.1 | 0.1 | 0.1 | 0.1 | 0.1 | 0.1 | 0.1 | 0.1 |

-continued

The following table shows the results obtained in the practical Examples 99 to 106 (all figures given in grams unless otherwise indicated):

| EXAMPLE | 99 | 100 | 101 | 102 | 103 | 104 | 105 | 106 |
|---|---|---|---|---|---|---|---|---|
| Rising height (cm) | 52 | 77 | 87 | 97 | 88 | 75 | 110 | 118 |
| $t_R$* (sec) | 15 | 15 | 15 | 15 | 15 | 15 | 15 | 15 |
| $t_L$* (sec) | 33 | 30 | 27 | 27 | 26 | 25 | 26 | 28 |
| $t_A$* (sec) | 37 | 34 | 33 | 32 | 32 | 27 | 31 | 35 |
| Unit weight (kg/m$^3$) | 199 | 154 | 129 | 114 | 131 | 175 | 111 | 103 |
| Compression strength (kp/cm$^2$) | 16.1 | 15.8 | 10.4 | 6.6 | 9.3 | 21.5 | 5.3 | 4.0 |

*see Example 93 for the definition of $t_R$, $t_L$ and $t_A$.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An inorganic-organic composition obtained by reacting a mixture of
   (A) from 5-98% by weight of an organic polyisocyanate,
   (B) from 2-95% by weight of an aqueous alkali metal silicate solution containing about 20-70% by weight of said alkali metal silicate, and
   (C) from 0-93% by weight of a water-binding component, said component being capable of absorbing water to form a solid or a gel,
   wherein said percents by weight of (A), (B) and (C) are based on the total weight of (A), (B) and (C), with the proviso that when (C) is 0-20% by weight, component (A) contains 2-200 milliequivalent of ionic groups or groups capable of forming salt groups in the presence of alkali metal silicates per 100 grams of said organic polyisocyanate, and wherein said composition is a solid/solid xerosol.

2. The composition of claim 1 with the further proviso that at least enough water is present in the reaction mixture to combine with substantially all of component (C).

3. The composition of claim 1 wherein said organic polyisocyanate contains ionic groups or groups capable of forming salt groups in the presence of alkali silicates.

4. The composition of claim 1 wherein the organic polyisocyanates contain 2-200 milliequivalents per 100 grams of ionic groups.

5. The composition of claim 1 wherein the aqueous silicate solution contains from 32-54% by weight silicate and the ratio by weight of polyisocyanate to silicate is from 70:30 to 20:80.

6. The composition of claim 1 wherein an inert liquid boiling at temperatures from −25° to +50° C is included in the reaction mixture as a blowing agent in a quantity of up to 50% by weight and the reaction mixture is allowed to react to completion while foaming.

7. The composition of claim 1 wherein the polyisocyanate is a phosgenation product of an aniline/formaldehyde condensate.

8. The composition of claim 1 in the form of a solid/solid xerosol in which the average transverse diameter of the dispersed phase is between 20 nm and 2 microns.

9. The composition of claim 8 wherein the average diameter is between 50 nm and 700 nm.

10. The composition of claim 8, wherein both phases are coherent.

11. The composition of claim 8 containing an inorganic or organic particulate or powder filler material.

12. The composition of claim 8 which contains glass fibers.

13. The composition of claim 1 wherein said composition is based on:
   (A) 10-80% by weight of said organic polyisocyanate,
   (B) 20-80% by weight of said aqueous alkali metal silicate solution, and
   (C) 10-70% by weight of said water-binding component.

14. The composition of claim 13, wherein the reaction mixture contains a foam stabilizer.

15. The composition of claim 13 wherein the reaction mixture contains a emulsifying agent.

16. The composition of claim 13 wherein the mixture contains an inert inorganic particulate or fibrous filler material.

17. The composition of claim 13 wherein the mixture contains an organic compound containing at least two hydrogen atoms which are reactive with isocyanate groups.

18. The composition of claim 13 wherein the alkali metal silicate is sodium silicate in which the molar ratio of $Na_2O:SiO_2$ is within the range of 1:1.6 and 1:3.3.

19. The composition of claim 13 wherein the polyisocyanate is an organic prepolymer which contains ionic groups or groups capable of forming salt groups in the presence of alkaline metal silicates.

20. The composition of claim 13 wherein the polyisocyanate contains sulphonic acid and/or sulphonate groups.

21. The composition of claim 13, wherein the water-binding component is a hydraulic cement, synthetic anhydrite, gypsum or burnt lime.

22. The composition of claim 13 wherein said composition is based on:
   (A) 10-50% by weight of said organic polyisocyanate,
   (B) 20-70% by weight of said alkali metal silicate solution, and
   (C) 20-70% by weight of said water-binding component.

23. The composition of claim 13 wherein said composition is based on:
   (A) 10-35% by weight of said organic polyisocyanate,
   (B) 30-60% by weight of said alkali metal silicate solution, and
   (C) 30-60% by weight of said water-binding component.

24. The foamed composition of claim 13, wherein the mixture contains a blowing agent.

25. The foamed composition of claim 24, wherein the blowing agent is a halogenated hydrocarbon with a boiling point below 100° C.

26. The composition of claim 13, wherein the mixture contains an activator which accelerates the reaction of isocyanate groups with water.

27. The composition of claim 26, wherein the activator is a tertiary amine.

28. The composition of claim 1 wherein the organic polyisocyanate is one prepared by reacting liquid mixtures of aromatic polyisocyanates which have an isocyanate content of 10–42% by weight and a viscosity of 8 to 10,000 cP at 25° C with
(a) compounds which contain carboxylate groups and hydrogen atoms which are reactive with isocyanate groups or
(b) hydroxy carboxylic or mercapto carboxylic acids, such that
(i) at least partial conversion of the carboxyl group into the corresponding carboxylate group by neutralization with a base is carried out simultaneously with or after the isocyanate addition reaction or
(ii) the hydroxy carboxylic acids or mercapto carboxylic acids used are of the kind in which the carboxyl groups are much less reactive with the isocyanate groups than are the hydroxyl or the mercapto groups, the quantitative proportion of the reactants being so chosen that the resultant organic polyisocyanate has an isocyanate content of 10–40% by weight and a carboxyl or carboxylate group content of 0.1 to 10% by weight.

29. The composition of claim 28, wherein the hydroxy carboxylic acids are reaction products containing hydroxyl, carboxyl and ester groups obtained by reacting polyhydric alcohols within a molecular weight range of 62 to 10,000 with polycarboxylic acid anhydrides.

30. The composition of claim 28, wherein the said liquid mixture of aromatic polyisocyanates contains phosgenation products of aniline, formaldehyde condensates with a dinuclear diisocyanate content of 30–100% by weight at least 10% of which consists of 2,2'- and/or 2,4'-isomers, a trinuclear content of 0–20% by weight and a tetranuclear or higher nuclear isocyanate content of 0–4%.

31. The composition of claim 28, wherein the said liquid mixture of aromatic polyisocyanates contains 40–90% by weight of phosgenation products of aniline/formaldehyde condensates which has a dinuclear content of 70–100%, and 10–60% by weight of tolylene diisocyanate.

32. The composition of claim 28, wherein the said liquid mixture of aromatic polyisocyanates is the commercial distillation residue obtained from the distillation of commercial tolylene diisocyanate mixtures, which distillation residue is characterized by containing a maximum of 50% by weight of free tolylene diisocyanate isomers.

33. The composition of claim 28, wherein the said liquid mixture of aromatic polyisocyanates is modified with 0.2 to 25 mol %, based on the original polyisocyanate mixture, of a compound which contains two hydroxyl groups either before, during or after the reaction.

34. The composition of claim 28 wherein the said liquid mixture of aromatic polyisocyanates is a phosgenation product of the condensate of aniline with aldehydes or ketones, which contain 20–80% by weight of dinuclear diisocyanates, 8–40% by weight of trinuclear triisocyanates, 3–20% by weight of tetranuclear tetraisocyanates, and 2–40% by weight of higher nuclear polyisocyanates.

35. The composition of claim 1, wherein the polyisocyanate contains phenolic hydroxyl groups, and is prepared by reacting an organic polyisocyanate with a phenol, which in addition to at least one phenolic hydroxyl group, contains at least one group which is more reactive with isocyanate groups than said phenolic hydroxyl group, the reactants being used in such proportions that the mixture contains at least 200 percent molar excess of isocyanate groups over the groups which react more readily with isocyanate groups than does the phenolic hydroxyl group.

* * * * *